US012728068B2

(12) United States Patent
Wang et al.

(10) Patent No.: US 12,728,068 B2
(45) Date of Patent: Sep. 8, 2026

(54) MASSAGE DEVICE

(71) Applicant: Dongguan Hongxiang Electronic Technology Co., Ltd., Dongguan (CN)

(72) Inventors: Qinduo Wang, Heyuan (CN); Yinyuan Li, Dongguan (CN); Dongjun Wu, Dongguan (CN)

(73) Assignee: Dongguan Hongxiang Electronic Technology Co., Ltd., Dongguan (CN)

( * ) Notice: Subject to any disclaimer, the term of this patent is extended or adjusted under 35 U.S.C. 154(b) by 0 days.

(21) Appl. No.: 19/183,908

(22) Filed: Apr. 20, 2025

(65) Prior Publication Data

US 2025/0325442 A1 Oct. 23, 2025

Related U.S. Application Data

(63) Continuation-in-part of application No. 19/014,259, filed on Jan. 9, 2025, which is a continuation-in-part (Continued)

(30) Foreign Application Priority Data

Apr. 19, 2024 (CN) ......................... 202420835778.3
Dec. 27, 2024 (CN) ......................... 202423268155.1

(51) Int. Cl.
*A61H 19/00* (2006.01)

(52) U.S. Cl.
CPC ............. *A61H 19/44* (2013.01); *A61H 19/34* (2013.01); *A61H 2201/1671* (2013.01); *A61H 2201/169* (2013.01)

(58) Field of Classification Search
CPC ........ A61H 19/34; A61H 19/30; A61H 19/32; A61H 19/40; A61H 19/44; A61H 23/02
See application file for complete search history.

(56) References Cited

U.S. PATENT DOCUMENTS 11,771,619 B1 10/2023 Yan
2025/0032351 A1 * 1/2025 Yan ........................ A61H 19/34

FOREIGN PATENT DOCUMENTS

CN 109549832 A 4/2019
JP 2007296299 A 11/2007

OTHER PUBLICATIONS

Notice of Refusal Dated Feb. 18, 2025 for Corresponding Japanese Patent Application No. 2025-011404.

(Continued)

*Primary Examiner* — Christine H Matthews

(57) ABSTRACT

A massage device includes a shell, a driving mechanism and a branch massage portion. The shell includes a first section, a second section and a third section connected one after another. The third section is configured as a main massage portion to be inserted into a human body in an insertion direction. The driving mechanism is disposed in the shell. The branch massage portion is connected to the shell and connected to the driving mechanism in a transmission manner. The driving mechanism is configured to drive the branch massage portion to rotate around a rotation axis. The branch massage portion extends in the insertion direction or in a direction opposite to the insertion direction. The branch massage portion and the third section provide a kneading and pressing massage effect on the organ of the human. Therefore, a better stimulation effect is provided, thereby improving the sexual experience.

3 Claims, 20 Drawing Sheets

Related U.S. Application Data of application No. 18/642,854, filed on Apr. 23, 2024, now Pat. No. 12,213,931.

(56) References Cited

OTHER PUBLICATIONS

Notice of Refusal Dated Jun. 17, 2025 for corresponding Japan Patent Application No. 2025-011404.

* cited by examiner

MASSAGE DEVICE

CROSS-REFERENCE TO RELATED APPLICATIONS

This is a continuation-in-part Application of U.S. patent application Ser. No. 19/014,259, filed on Jan. 9, 2025, which is a Continuation in part Application of U.S. patent application Ser. No. 18/642,854, filed on Apr. 23, 2024, which claims the priorities of Chinese Utility Model application Ser. No. 20/2420202016.X, filed on Jan. 26, 2024, and Chinese Utility Model application Ser. No. 20/242, 0687877.1, filed on Apr. 3, 2024, which claims priorities of Chinese Utility Model application Ser. No. 20/2423268155.1, filed on Dec. 27, 2024, and Chinese Utility Model application Ser. No. 20/2420835778.3, filed on Apr. 19, 2024, the entire contents of which are hereby incorporated by reference.

TECHNICAL FIELD

The present application relates to the technical field of massage products, and in particular to a massage device.

BACKGROUND

In recent years, massage devices are developed to help the users to release their sex pressure. Generally, an existing massage device uses a vibration motor to provide vibration to the user's sensitive areas, such as the female genitalia, the male genitalia and the like, which has poor stimulation effects and is therefore difficult to meet users' needs.

SUMMARY

An object of the present application is to provide a massage device which can provide better stimulation effects, thereby improving the sexual experience.

In order to achieve the above object, a technical solution of the present application provides a massage device, including:

- a shell including a first section, a second section, and a third section connected one after another with the second section being connected between the first section and the third section, and the third section being configured as a main massage portion to be inserted into human body in an insertion direction;
- a driving mechanism disposed in the shell; and
- a branch massage portion connected to the shell, the branch massage portion being connected to the driving mechanism in a transmission manner, wherein the driving mechanism is configured to drive the branch massage portion to rotate around a rotation axis;
- wherein the branch massage portion extends in the insertion direction or in a direction opposite to the insertion direction.

In one of the embodiments, the shell defines a recess portion, the first section, the second section, and the third section cooperatively define the recess portion, and the branch massage portion extends into the recess portion.

In one of the embodiments, the shell of at least one of the first section, the second section, or the third section includes an outer layer and an inner layer, the inner layer is covered by the outer layer, and the outer layer is a soft layer.

In one of the embodiments, a maximum cross-sectional area of the first section and a maximum cross-sectional area the third section are both larger than a maximum cross-sectional area of the second section, thereby forming the recess portion at one side of the second section.

In one of the embodiments, the driving mechanism is disposed in an inner cavity of the first section, the branch massage portion is arranged on a side wall of the first section that forms the recess portion.

In one of the embodiments, the driving mechanism is disposed in an inner cavity of the third section, the branch massage portion is arranged on a side wall of the third section that forms the recess portion.

In one of the embodiments, a distal end of the branch massage portion and an end of the third section away from the second section are connected by a connecting portion, and the connecting portion is made of soft material.

In one of the embodiments, the driving mechanism includes a driving motor and a drive shaft, the drive shaft includes a first shaft body and a second shaft body connected to each other, wherein an end of the first shaft body away from the second shaft body is connected to a motor shaft of the driving motor, at least an end of the second shaft body away from the first shaft body extends into the recess portion, the second shaft body is connected to the branch massage portion in a transmission manner, and the driving motor drives the second shaft body to rotate around the rotation axis, with a longitudinal axis of the second shaft body being at an angle with respect to the rotation axis.

In one of the embodiments, the branch massage portion includes a massage housing connected to the second shaft body.

In one of the embodiments, the branch massage portion further includes a flexible sleeve covering an exterior of the massage housing.

In one of the embodiments, the branch massage portion further includes a first vibration motor installed inside the massage housing;

- the massage device further includes a second vibration motor installed in an inner cavity of the third section to drive the third section to move;
- the first section and the second section are arranged at an angle, with the first section inclined towards the branch massage portion, a protrusion is formed on a side of the first section facing the branch massage portion, and a third vibration motor is installed in the first section In one of the embodiments, an angle between the first section and the second section is an acute angle, such that the first section and the second section substantially form an L-shape.

In one of the embodiments, the massage device further includes a control board and a battery installed in the inner cavity of the first section, the control board is electrically connected to the battery, and the control board is electrically connected to the driving motor, the first vibration motor, the second vibration motor, and the third vibration motor.

In one of the embodiments, the branch massage portion is elongated.

In one of the embodiments, a maximum cross-sectional area of the third section is larger than that of the branch massage portion.

In one of the embodiments, the third section servers as a first massage portion and the branch massage portion servers as a second massage portion, and the maximum cross-sectional area of the third section is larger than that of the branch massage portion.

In order to achieve the above object, another technical solution of the present application provides a massage device, including:

a shell including a first section, a second section, and a third section connected each other, the second section is connected between the first section and the third section;

a driving mechanism disposed in the shell; and a branch massage portion connected to the driving mechanism in a transmission manner, wherein the driving mechanism is configured to drive the branch massage portion to rotate;

wherein the branch massage portion is elongated and extends at least partially along a lateral side of the shell with a gap defined between the branch massage portion and the lateral side of the shell.

In one of the embodiments, the driving mechanism includes a driving motor and a drive shaft, the drive shaft includes a first shaft body and a second shaft body connected to each other, wherein an end of the first shaft body away from the second shaft body is connected to a motor shaft of the driving motor, at least an end of the second shaft body away from the first shaft body extends into the recess portion, the second shaft body is connected to the branch massage portion in a transmission manner, the driving motor drives the second shaft body to rotate around the rotation axis, with a longitudinal axis of the second shaft body being at an angle with respect to the rotation axis.

In one of the embodiments, the shell defines a recess portion, the first section, the second section and the third section cooperatively define the recess portion, and the branch massage portion extends into the recess portion.

In one of the embodiments, the driving mechanism is disposed in an inner cavity of the first section, the branch massage portion is arranged on a side wall of the first section that forms the recess portion, and the branch massage portion is connected to the driving mechanism in a transmission manner.

In one of the embodiments, the driving mechanism is disposed in an inner cavity of the third section, the branch massage portion is arranged on a side wall of the third section that forms the recess portion, and the branch massage portion is connected to the driving mechanism in a transmission manner.

Implementing the embodiments of the present application will have the following beneficial effects:

In the massage device of the present application, the third section and the branch massage portion may massage different portions of body simultaneously. The driving mechanism and the branch massage portion are installed in the shell to form an organic entity with an appropriate and compact arrangement, a small size, and a light weight, making it convenient to use. For example, when massaging an organ of human, the organ of human (such as a male penis or a female clitoris) may be directly placed on the shell with the organ of human in contact with the branch massage portion, or the branch massage portion may be inserted into a vagina of woman. Then, the driving mechanism is activated to drive the branch massage portion to perform a circular rotating motion within the recess portion along a preset direction, thereby providing a kneading and pressing massage effect on the organ of human. Therefore, a better stimulation effects is provided, thereby improving the sexual experience. Compared to the prior art, the massage device of this solution may achieve automatic massage operations on the organ of human without increasing the user's burden and fatigue, offering good massage effects and user experience.

BRIEF DESCRIPTION OF THE DRAWINGS

In order to illustrate the technical solution in embodiments of the present application more clearly, the following briefly introduces accompanying drawings used in the description of the embodiments. Obviously, the accompanying drawings in the following description are only some embodiments of the present application. Those of ordinary skill in the art can obtain other accompanying drawings from these accompanying drawings without any creative efforts.

DESCRIPTION OF THE EMBODIMENTS

In order to make those skilled in the art better understand the technical solution of the present application, the technical solution in the embodiments of the present application will be clearly and completely described below with reference to accompanying drawings in the embodiments of the present application. Obviously, the described embodiments are only a part of the embodiments of the present application, but not all of the embodiments. Based on the embodiments of the present application, all other embodiments obtained by those skilled in the art without any creative efforts fall within the protection scope of the present application.

It should be noted that when an element is said to be "connected" to another element, it may be directly connected to another element, or indirectly connected to another element through one or multiple intermediate elements.

In the specification, the oriental or positional relationships indicated by the terms "longitudinal", "transverse", "top", "bottom", "inner", "outer", "central", "axial", "radial", "circumferential" and the like are only intended to facilitate the description of the present application and simplify the description based on oriental or positional relationships shown in the accompanying drawings, not to indicate or imply that the apparatus or element referred must have a specific orientation, is constructed and operated in a specific orientation, and therefore cannot be understood as a limitation of the present application.

Unless otherwise specified and limited, the specific meanings of all technical and scientific terms used in the specification can be specifically understood by persons of ordinary skill in the art. The terms used in the specification of this application is for the purpose of describing specific embodiments only and is not intended to limit this application.

First Embodiment

Figure 1:
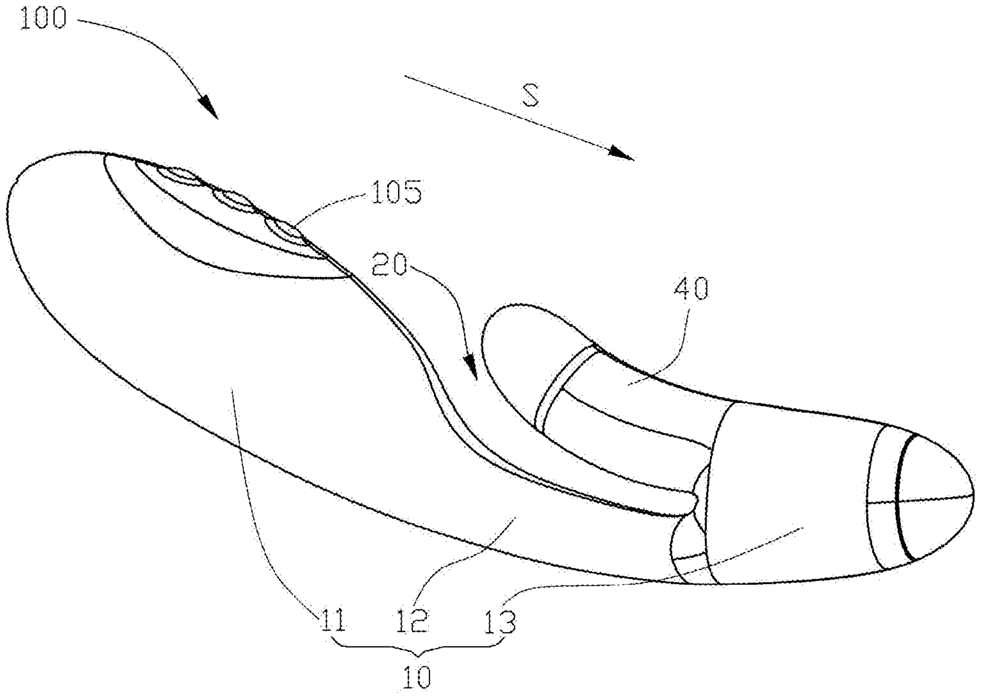
FIG. 1 is an isometric view of a massage device according to a first embodiment of the present application.
Figure 2:
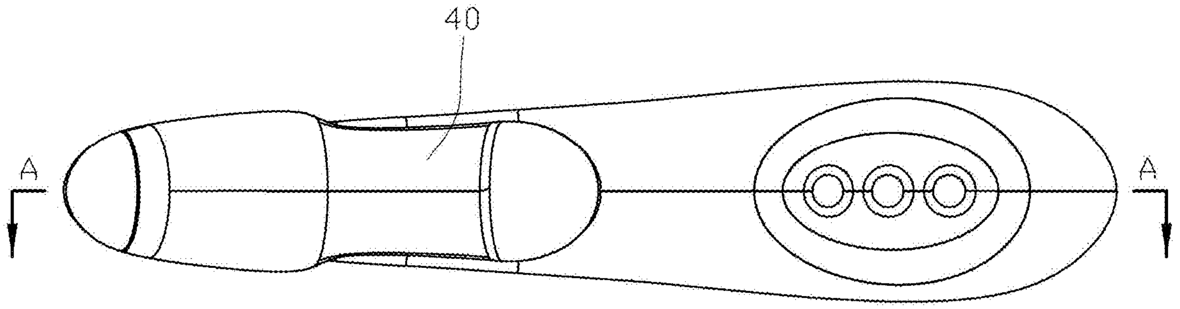
FIG. 2 is a top plan view of the massage device of FIG. 1.
Figure 3:
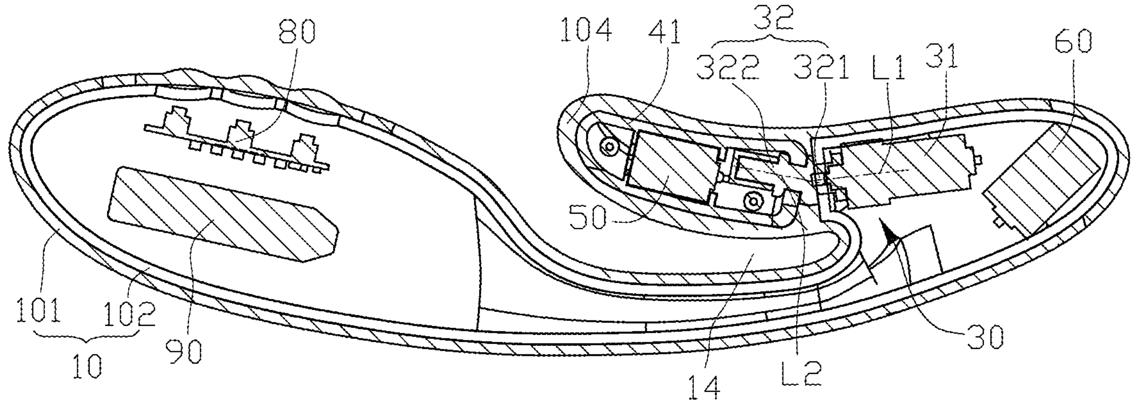
FIG. 3 is a cross sectional view of the massage device taken along line A-A of FIG. 2.

Referring to FIG. 1 to FIG. 3, a massage device 100 according to a first embodiment of the present application is shown. The massage device 100 includes a shell 10 including a first section 11, a second section 12, and a third section 13. The first section 11, the second section 12, and the third section 13 are connected one after another, with the second section 12 connected between the first section 11 and the third section 13. The third section is configured as a main massage portion to be inserted into human body in an insertion direction. The massage device 100 further includes a driving mechanism 30 disposed in the shell 10 and a branch massage portion 40 connected to the shell 10. The branch massage portion 40 is connected to the driving mechanism 30 in a transmission manner. The driving mechanism 30 is configured to drive the branch massage portion 40 to rotate around a rotation axis L1. The branch massage portion extends in the insertion direction or in a direction opposite to the insertion direction. Specifically, the branch massage portion rotates in a circular motion along a preset direction, that is, driven by the driving mechanism 30, the massage portion 40 rotates around the rotation axis L1 to form an annular trajectory.

Implementing the embodiments of the present application will have the following beneficial effects:

In the massage device 100 of the present application, the third section 13 and the branch massage portion 40 may massage different portions of body simultaneously. The driving mechanism 30 and the branch massage portion 40 are installed in the shell 10 to form an organic entity with an appropriate and compact arrangement, a small size, and a light weight, making it convenient to use. For example, when massaging an organ of human, the organ of human (such as a male penis or a female clitoris) may be directly placed on the shell 10 with the organ of human in contact with the branch massage portion 40, or the branch massage portion 40 may be inserted into a vagina of woman. Then, the driving mechanism 30 is activated to drive the branch massage portion 40 to perform a circular rotating motion along a preset direction, thereby providing a kneading and pressing massage effect on the organ of human. Therefore, a better stimulation effects is provided, thereby improving the sexual experience. Compared to the prior art, the massage device 100 of this solution may achieve automatic massage operations on the organ of human without increasing the user's burden and fatigue, offering good massage effects and user experience.

In this embodiment, the shell 10 defines a recess portion 20. The branch massage portion 40 extends into the recess portion 20. The recess portion 20 provides a necessary space for the branch massage portion 40 to perform circular rotating, allowing for a more compact arrangement of the branch massage portion 40 and the shell 10, thereby reducing the overall size of the massage device 100 and achieving a miniaturized design.

Please referring to FIG. 1 to FIG. 3 again, for ease of holding and using, the shell 10 extends along a first direction essentially parallel to the insertion direction. In this embodiment, the first section 11, the second section 12, and the third section 13 cooperatively define the recess portion 20. This arrangement simplifies the formation of the recess portion 20, eliminating the need for additional processing, reducing manufacturing costs and difficulty, thus making the massage device 100 to have a long and narrow structure, small size, and minimal space occupation.

Specifically, the branch massage portion 40 is an elongated (i.e., the branch massage portion 40 is long and thin) and extends at least partially along a lateral side of the shell 10 with a gap 14 defined between the branch massage portion and the lateral side of the shell 10.

Specifically, a maximum cross-sectional area of the first section 11 and a maximum cross-sectional area of the third section 13 are both larger than that of the second section 12, thereby forming the recess portion 20 at one side of the second section 12. A maximum cross-sectional area of the third section 13 is larger than that of the branch massage portion 40.

For example, the first direction may refer to a length direction of the massage device 100, as indicated by the arrow S in FIG. 1.

To improve comfort, in one embodiment, the shell 10 of at least one of the first section 11, the second section 12, and the third section 13 includes an outer layer 101 and an inner layer 102 with the inner layer 102 covered by the outer layer 101. The outer layer 101 may be a soft layer. For example, the soft layer may be made of soft rubber. Soft rubber provides a gentle contact with the skin, offering a good touch experience and comfort. In this application, the inner layer 102 may be made of metal, plastic, or any other material. Preferably, to achieve a certain structural strength while reducing the overall weight, facilitating lightweight design, and improving user experience, the inner layer 102 is made of plastic.

In this application, the inner layers 102 of the first section 11, the second section 12, and the third section 13 are formed as an integrated structure. The shell 10 of each of the first section 11, the second section 12, and the third section 13 includes the outer layer 101 and the inner layer 102 with the inner layer 102 covered by the outer layer 101. The outer layers 101 of the first section 11, the second section 12, and the third section 13 form an integral structure of a soft layer, ensuring both a holding comfort and massaging comfort.

In one embodiment, the driving mechanism 30 is disposed in an inner cavity of the first section 11, the branch massage portion 40 is arranged on a side wall of the first section 11 that forms the recess portion 20, and the branch massage portion 40 is connected to the driving mechanism 30 in a transmission manner. Alternatively, the driving mechanism 30 may be disposed in an inner cavity of the third section 13, the branch massage portion 40 is arranged on a side wall of the third section 13 that forms the recess portion 20, and the branch massage portion 40 is connected to the driving mechanism 30 in a transmission manner.

This arrangement allows the branch massage portion 40 to extend into the recess portion 20 and utilize an ample space provided by the recess portion 20 to perform circular rotating motions, thereby massaging the organ of human, providing better stimulation effects and improving the sexual experience. It also allows the massage device 100 to take on different product forms to meet the preferences and needs of different consumers.

In this application, the branch massage portion 40 is rotatable clockwise or counterclockwise at a constant or variable speed. An offset angle between the branch massage portion 40 and the rotation axis L1 ranges from 0° to 60°.

Please referring to FIG. 1 to FIG. 3, in another embodiment, the driving mechanism 30 includes a driving motor 31 and a driving shaft 32. The driving shaft 32 includes a first shaft body 321 and a second shaft body 322 connected at an angle. The first shaft body 321 is connected to a motor shaft T1 of the driving motor 31 at an end away from the second shaft body 322, and at least the second shaft body 322 extending into the recess portion 20 at an end away from the first shaft body 321. The second shaft body 322 is connected to the branch massage portion 40 in a transmission manner. The driving motor 31 drives the second shaft body 322 to rotate around the rotation axis L1, with a longitudinal axis L2 of the second shaft body 322 being at an angle with respect to the rotation axis L1.

In this embodiment, the first shaft body 321 and the second shaft body 322 are connected at an angle, and the first shaft body 321 extends along the rotation axis L1. Since the first shaft body 321 and the second shaft body 322 are connected at an angle, the second shaft body 322 is rotatable in a circular motion around a central axis L1 of the first shaft body 321 (i.e., the rotation axis L1). Thus, when the driving motor 31 drives the first shaft body 321 to rotate, the second shaft body 322 drives the branch massage portion 40 to rotate in a circular motion within the recess portion 20, providing a kneading and pressing massage effect on the organ of human. This driving structure and manner are simple, feasible, cost-effective, and highly reliable with good durability.

In one embodiment, the branch massage portion 40 includes a massage housing 41 connected to the second shaft body 322. The second shaft body 322 and the massage housing 41 are rigidly connected, allowing the second shaft body 322 to transmit rotational power to the massage housing 41, thereby driving the entire massage housing 41 to rotate, thereby driving a part of the following flexible sleeve 104 to move in a circular path.

For example, the connection between the massage housing 41 and the second shaft body 322 can be, but is not limited to, snap-fitting, screw connection, adhesive bonding, or any combination thereof.

Since the branch massage portion 40 needs to contact the organ of human during operation and will generate kneading and pressing forces on the organ of human, to reduce the intensity of these forces on the skin and improve massage comfort, the branch massage portion 40 further includes a flexible sleeve 104 covering the exterior of the massage housing 41 in one embodiment. In one embodiment, the outer layer 101 of the shell 10 and the flexible sleeve 104 may be an integral structure.

For example, the flexible sleeve 104 is made of soft rubber.

In one embodiment, the branch massage portion 40 is finger-shaped.

In addition, the branch massage portion 40 further includes a first vibration motor 50 installed within the massage housing 41. While the branch massage portion 40 provides kneading and pressing massage on the organ of human, the first vibration motor 50 simultaneously outputs vibration forces, combining vibration and kneading effects to enhance the massage effect of the massage device 100.

Similarly, when the organ of human is massaged, the organ also contacts with the outer wall of the third section 13. In one embodiment, the massage device 100 further includes a second vibration motor 60, which is installed in the inner cavity of the third section 13. The vibration force generated by the second vibration motor 60 is transmitted to the organ of human, which can also enhance the massage effect.

It is easy to understand that, in actual use, the first vibration motor 50 and the second vibration motor 60 may be activated individually, or may be activated simultaneously, depending on the actual needs.

In one embodiment, the massage device 100 further includes a control board 80 and a battery 90. The control board 80 and the battery 90 are installed in the inner cavity of the first section 11. The control board 80 is electrically connected to the battery 90, and the control board 80 is electrically connected to the driving motor 31, the first vibration motor 50, and the second vibration motor 60. The battery 90 supplies power to the control board 80, which in turn supplies power to the driving motor 31, the first vibration motor 50, and the second vibration motor 60. The control board 80 may control the start/stop and output power of the driving motor 31, the first vibration motor 50, etc., thereby regulating the massage speed of the branch massage portion 40 to meet the different massage needs of various users.

In one embodiment, the massage device 100 further includes a plurality of buttons 105. These buttons 105 are located on the outer side of the shell 10 and are electrically connected to the control board 80. The massage device 100 may be controlled through the buttons 105. Specifically, in this embodiment, the buttons 105 are positioned on the first section 11.

Second Embodiment

Figure 4:
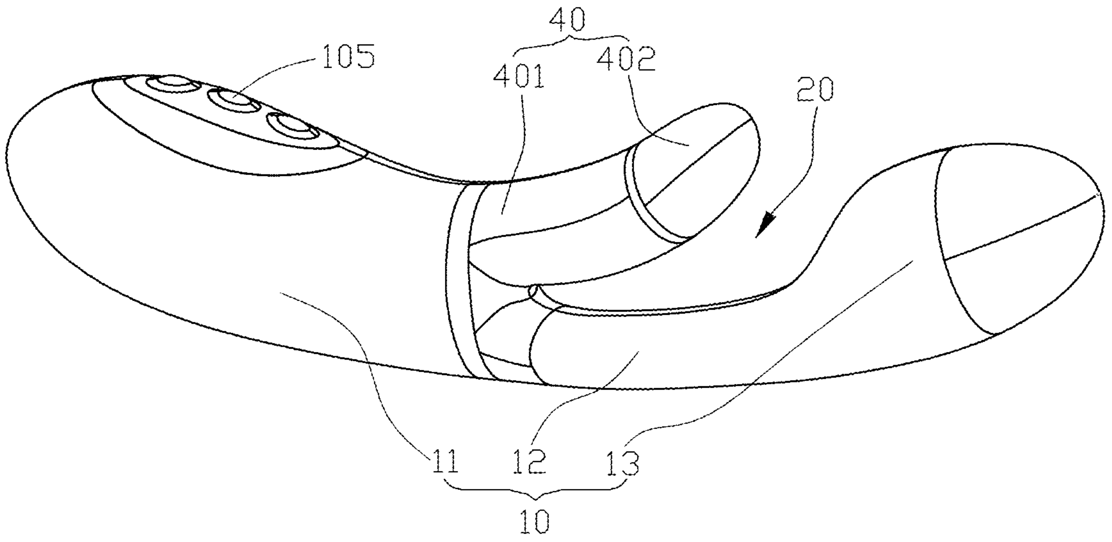
FIG. 4 is an isometric view of a massage device according to a second embodiment of the present application.
Figure 5:
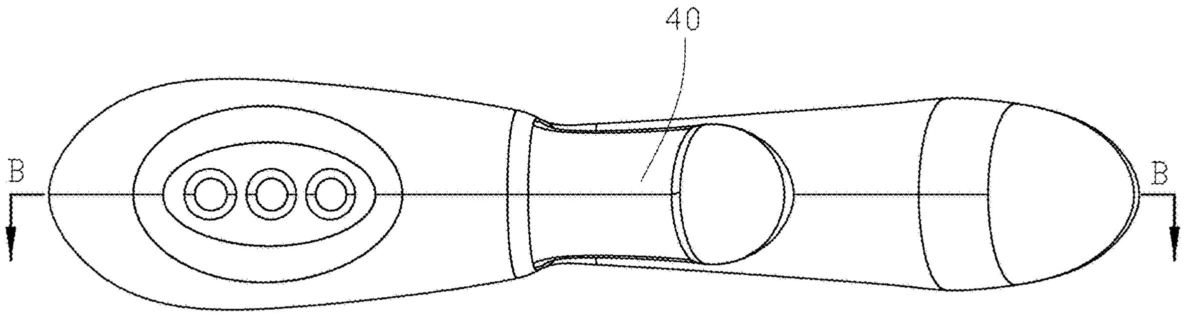
FIG. 5 is a top plan view of the massage device of FIG. 4.
Figure 6:
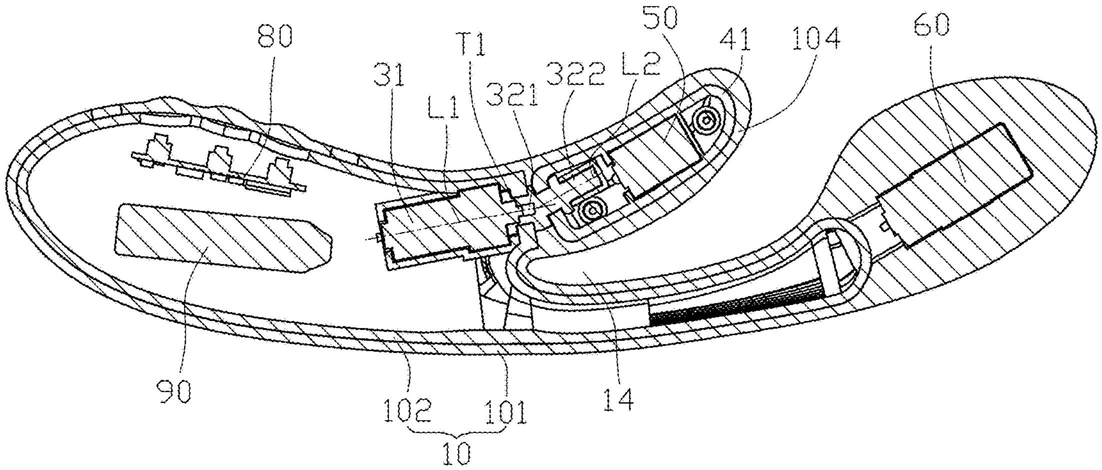
FIG. 6 is a cross sectional view of the massage device taken along line B-B of FIG. 5.

The massage device according to the second embodiment of this application has similar structure as that of the massage device 100 of the first embodiment. FIG. 4 to FIG. 6 show a second embodiment of the massage device of the present application, which differs from the first embodiment mainly in the branch massage portion 40 and the driving motor 31.

In the second embodiment, the branch massage portion 40 is disposed on the first section 11 of the shell 10 and is oriented towards the third section 13. Additionally, the driving motor 31 is installed inside the first section 11. The branch massage portion 40 has a base end 401 connected to the first section 11 and a distal end 402.

In this embodiment, the third section 13 of the shell 10 includes the outer layer 101 only, that is, the inner layer 102 does not extend to the third section 13. The second vibration motor 60 is directly received in the outer layer 101.

In this embodiment, both the third section 13 and the branch massage portion 40 may be inserted into an organ of human (such as vagina of woman). The third section 13 and the branch massage portion 40 may stimulate the organ of human in different manner, thereby performing different massage effects. Further, the third section 13 and the branch massage portion 40 may also massage different portions of body simultaneously.

The other structural features of the massage device of the second embodiment are similar to those of the first embodiment and will not be repeated here.

Third Embodiment

Figure 7:
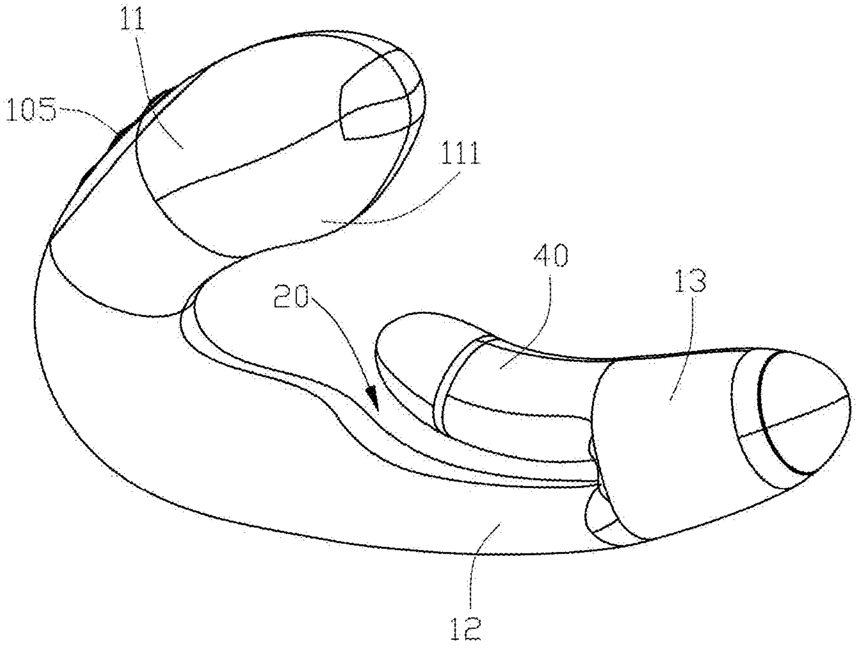
FIG. 7 is an isometric view of a massage device according to a third embodiment of the present application.
Figure 8:
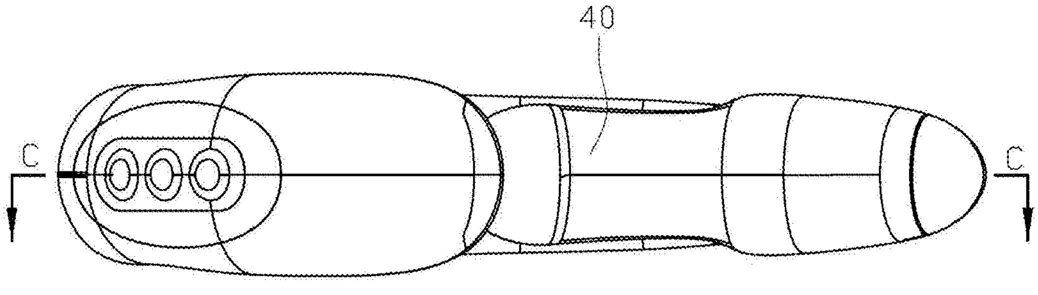
FIG. 8 is a top plan view of the massage device of FIG. 7.
Figure 9:
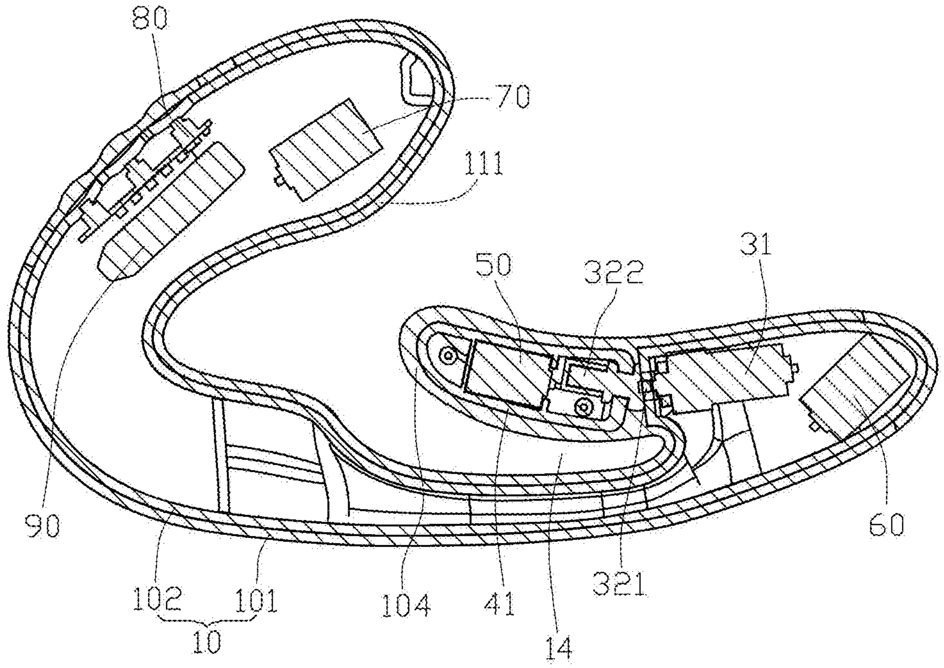
FIG. 9 is a cross sectional view of the massage device taken along line C-C of FIG. 8.

The massage device according to the third embodiment of this application has similar structure as that of the massage device 100 of the first embodiment. FIG. 7 to FIG. 9 show a third embodiment of the massage device of the present application, which differs from the first embodiment mainly in the first section 11. In the third embodiment, the first section 11 is arranged at an angle to the second section 12, and the first section 11 is inclined towards the branch massage portion 40. A protrusion 111 is formed on a side of the first section 11 facing the branch massage portion 40, and a third vibration motor 70 is installed in the first section 11.

By inclining the first section 11 towards the branch massage portion 40, the protrusion 111 can come into contact with the human body. Subsequently, by activating the third vibration motor 70, the vibration force may be transmitted to the human body, thereby achieving a vibrating massage effect.

In one of the embodiments, the angle defined between the first section 11 and the second section 12 is preferably an acute angle, so that the first section 11 and the second section 12 substantially form an L-shape.

In this embodiment, the control board 80 is electrically connected to the third vibration motor 70. The battery 90 supplies power to the control board 80, which in turn supplies power to the third vibration motor 70.

It is easy to understand that, in actual use, the first vibration motor 50, the second vibration motor 60, and the third vibration motor 70 may be activated individually, or any two or more may be activated simultaneously, depending on the actual needs.

The other structural features of the massage device of the third embodiment are similar to those of the first embodiment and will not be repeated here.

Fourth Embodiment

Figure 10:
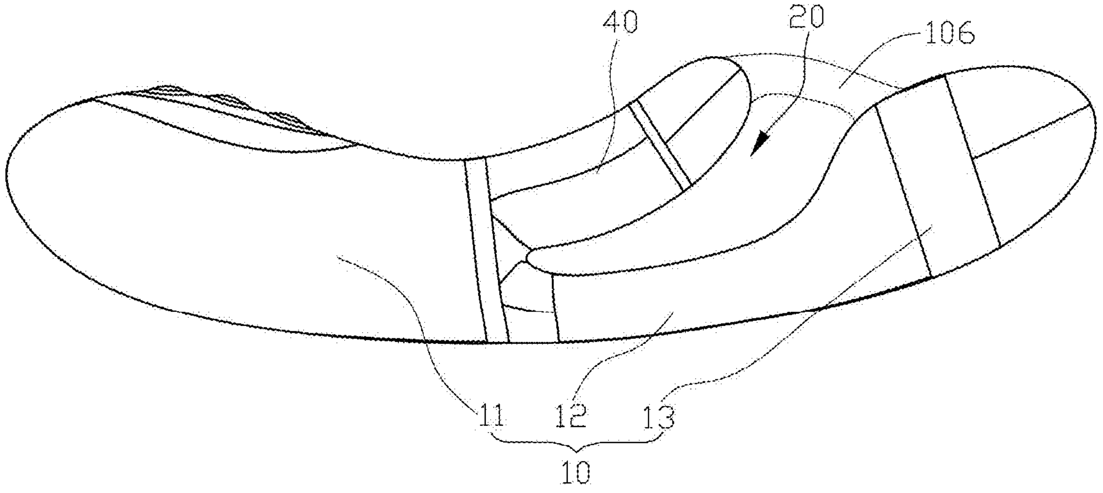
FIG. 10 is a front plan view of a massage device according to a fourth embodiment of the present application.
Figure 11:
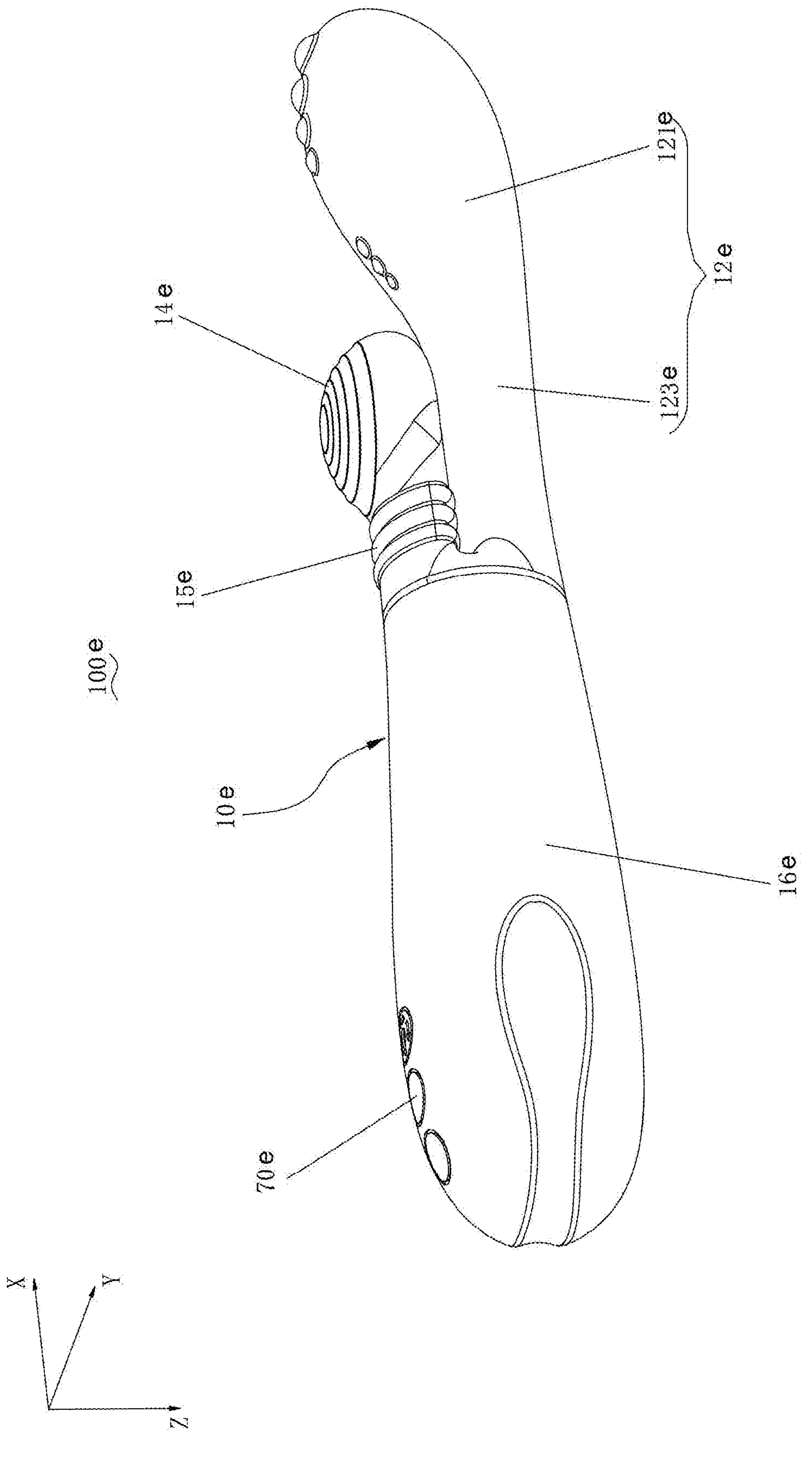
FIG. 11 is a schematic, assembled view of a massage device according to a fifth embodiment of the present application.
Figure 12:
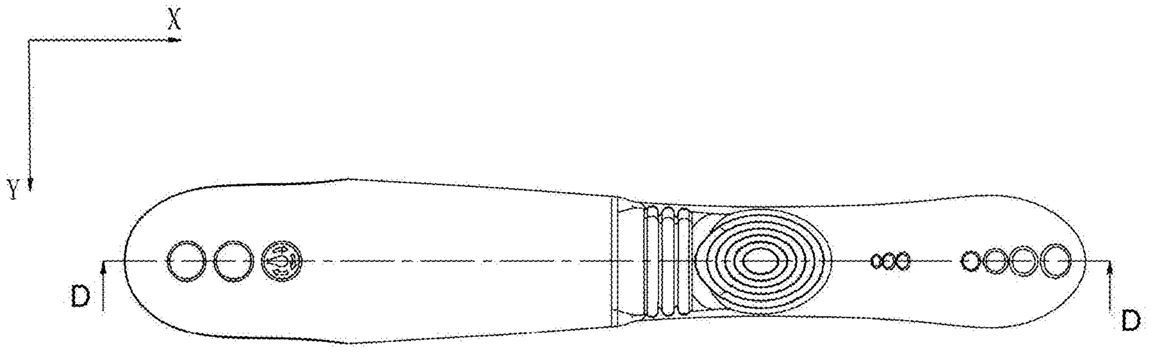
FIG. 12 is a top plan view of the massage device of FIG. 11.

The massage device according to the fourth embodiment of this application has similar structure as that of the massage device 100 of the second embodiment. FIG. 10 shows a fourth embodiment of the massage device of the present application, which differs from the second embodiment mainly in a connecting portion 106. In the fourth embodiment, a distal end of the branch massage portion 40 and an end of the third section 13 away from the second section 12 are connected by the connecting portion 106. Specifically, the connecting portion 106 is made of soft material such as soft rubber.

It is understood that, a distal end of the branch massage portion 40 and an end of the first section 11 away from the second section 12 may be connected by a connecting portion.

The other structural features of the massage device of the fourth embodiment are similar to those of the second embodiment and will not be repeated here.

Fifth to Eighth Embodiment

Referring to FIGS. 11-14, a massage device according to an embodiment of the present application is shown. In this embodiment, the massage device **100*e* includes a shell 10*e* being provided with a first massage portion 12*e* and a second massage portion 14*e*, a first driving mechanism 20*e* mounted in the shell 10*e* for driving the first massage portion 12*e*, and a second driving mechanism 30*e* mounted in the shell 10*e* for driving the second massage portion 14*e*. The massage device 100*e* of this application includes two massage portions 12*e*, 14*e*, which are respectively driven by two driving mechanisms 20*e*, 30*e*, and thus can simultaneously stimulate two parts of the human body. A stimulation area of this massage device 100*e*** is thus enlarged and accordingly a stimulation effect is better.

In an embodiment, the shell **10*e* is generally elongated and rod-shaped, and further includes a shell body 16*e*. The first and second massage portions 12*e*, 14*e* extend outwardly from the shell body 16*e* along a first direction, such as a longitudinal direction of the shell 10*e* (i.e., X-direction in the drawings), respectively. In the X-direction, the first massage portion 12*e* has a length greater than that of the second massage portion 14*e*, causing a distal part of the first massage portion 12*e* to extend beyond the second massage portion 14*e*. In a second direction, such as a lateral direction of shell 10*e* (i.e., Z-direction in the drawings), the second massage portion 14*e* and the first massage portion 12*e*** are spaced from each other, so as to ensure that their movements do not interfere with each other and finally not affect the stimulation effect.

During use, the first massage portion **12*e* and second massage portion 14*e* of the shell 10*e* may be inserted into the human body, such as inserted into the vagina, the rectum, and etc. When the massage device 100*e* is used by a male user, the first massage portion 12*e* may enhance the stimulation to the prostate. When the massage device 100*e* is used by a female user, the second massage portion 14*e*** may enhance the stimulation to the clitoris.

In an embodiment, the first massage portion **12*e* includes a front end section 121*e* and a connecting section 123*e* connected between the front end section 121*e* and the shell body 16*e*. In the X-direction, the front end section 121*e* extends beyond the second massage portion 14*e*, that is, the front end section 121*e* is staggered from the second massage portion 14*e*. In the Z-direction, the second massage portion 14*e* and the transition section 123*e* are arranged side by side. Preferably, in the lateral direction of the shell 10*e*, a size of the connecting section 123*e* of the first massage portion 12*e* is smaller than a size of the front end section 121*e*, thereby forming an avoidance space for the setting of the second massage portion 14***e*. Preferably, the maximum of the overall lateral size of the second massage portion 14*e* and the connecting section 123*e* of the first massage portion 12*e* is substantially the same as the maximum lateral size of the front end section 121*e*, so that the setting of the second massage portion 14*e* will generally not increase the overall lateral size of the shell 10*e*.

The first driving mechanism 20*e* is set in the first massage portion 12*e*, particularly in the front end section 121*e*, for driving the first massage portion 12*e* to move in the first manner.

Figure 13:
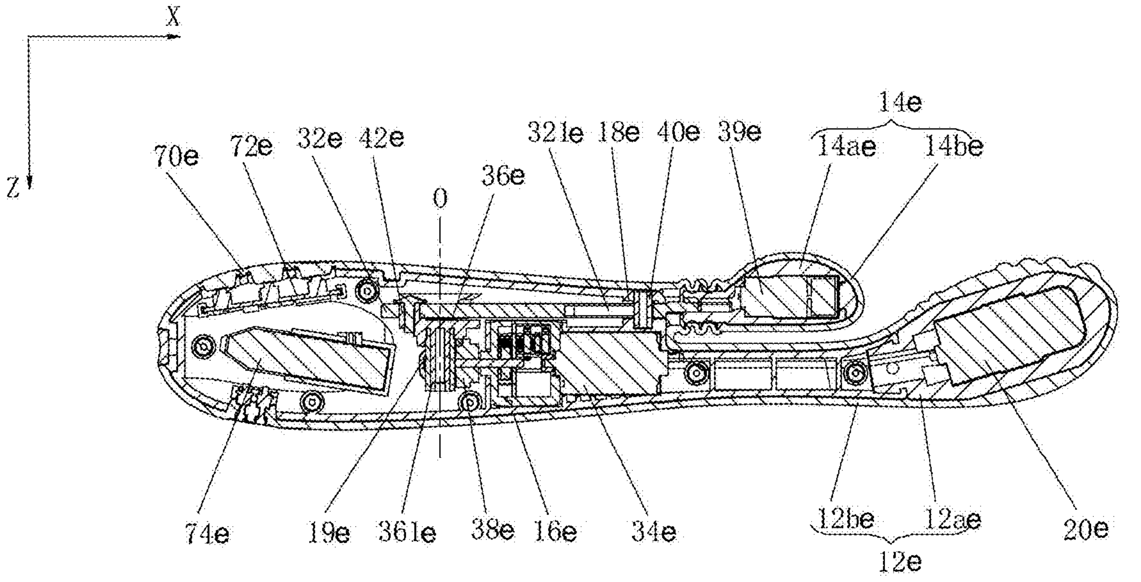
FIG. 13 is a cross sectional view of the massage device taken along line D-D of FIG. 12.
Figure 14:
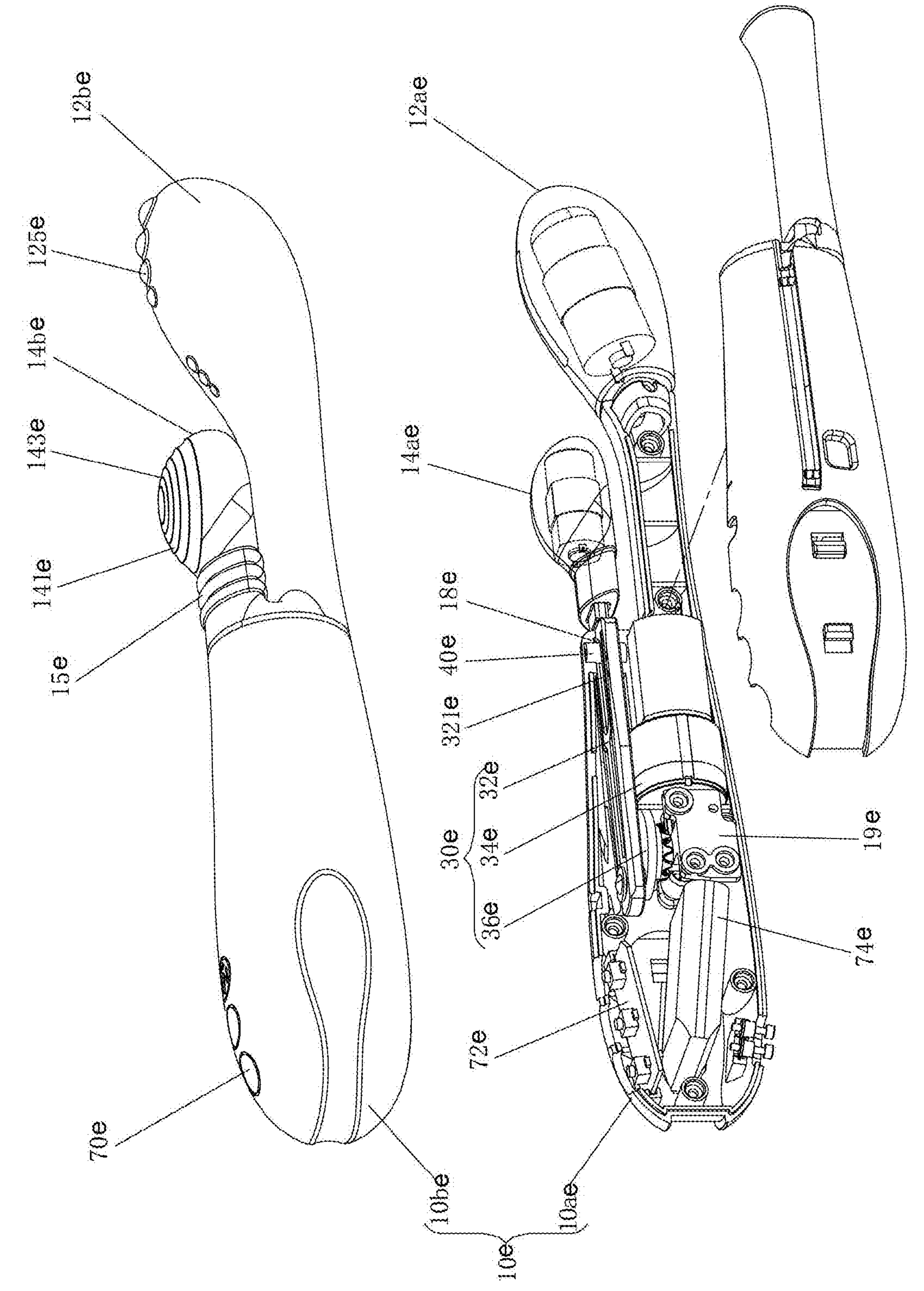
FIG. 14 a schematic, exploded view of the massage device of FIG. 11.
Figure 15:
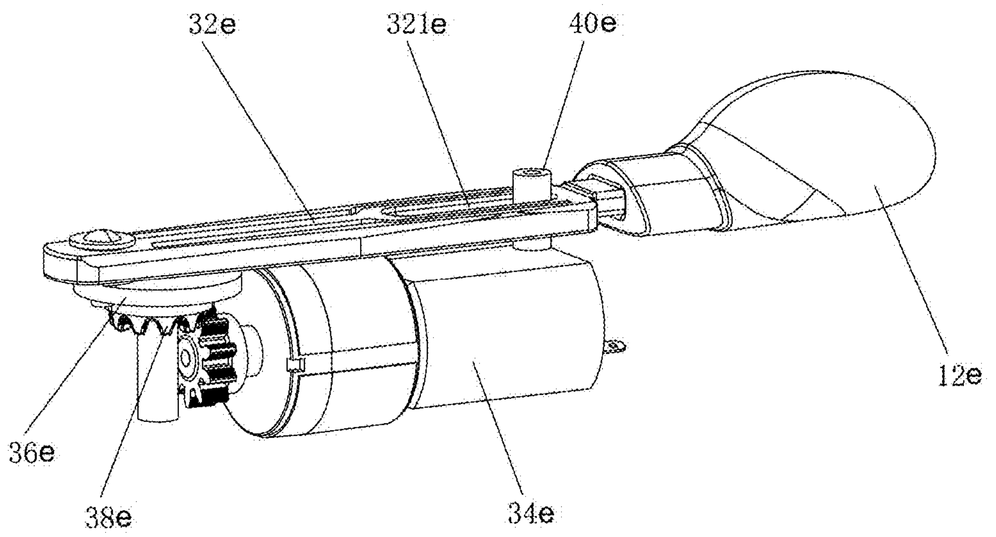
FIG. 15 is a schematic view of a second massage portion and its driving mechanism of the massage device.

In an embodiment, as shown in FIGS. 13-14, the first driving mechanism 20*e* is a first vibration motor. When the first driving mechanism 20*e* is activated, it drives the first massage portion 12*e* to vibrate at a certain frequency, stimulating the human body, such as the vagina or the rectum through vibration. It should be understood that during use, the vibration frequency of the first driving mechanism 20*e* may be adjusted according to the user's needs.

In an embodiment, the second driving mechanism 30*e* includes a swing arm 32*e*. The swing arm 32*e* is arranged in the shell body 16*e* with one end thereof connected to the second massage portion 14*e*, thereby driving the second massage portion 14*e* to do reciprocating motion. Specifically, the swing arm 32*e* is slidably connected to the shell 10*e* by a first shaft 40*e*, allowing the second massage portion 14*e* to do linear reciprocating motion relative to the shell 10*e*. At the same time, the swing arm 32*e* is rotatably connected to the shell 10*e* by a second shaft 42*e*, allowing the second massage portion 14*e* to do reciprocating swinging relative to the shell 10*e*. The linear reciprocating motion and reciprocating swinging of the second massage portion 14*e* are superimposed, finally forming an annular trajectory, such as a circular trajectory, an elliptical trajectory and the like. Thus, the second massage portion 14*e* is driven to knead the sensitive area of the human body, such as the vaginal wall of the woman, stimulating the crus of clitoris.

In an embodiment, as shown in FIGS. 15-18, the swing arm 32*e* is generally an elongated plate with a longitudinal direction thereof being consistent with the X-direction. A middle portion of the swing arm 32*e* is slidably connected to the shell 10*e* through the first shaft 40*e*, and another end of the swing arm 32*e* is pivotally connected to the shell 10*e* through the second shaft 42*e*. The axial direction of the first shaft 40*e* and the second shaft 42*e* is basically consistent with the Z-direction and perpendicular to the swing arm 32*e*. When the second shaft 42*e* is driven to rotate around an axis O in a longitudinal plane, such as the XY-plane, which is perpendicular to the Z-direction, due to the limitation of the first shaft 40*e*, the rotational motion of the second shaft 42*e* is transformed into the linear reciprocating motion of the swing arm 32*e* in the X-direction and the reciprocating swinging in the XY-plane, finally driving the second massage portion 14*e* connected to the swing arm 32*e* to move along a circular trajectory.

In an embodiment, the swing arm 32*e* is provided with a sliding groove 321*e* at a portion thereof adjacent to the second massage portion 14*e*. The sliding groove 321*e* is elongated and extends along the X-direction. The first shaft 40*e* is inserted into the sliding groove 321*e*, with a diameter generally equivalent to a width of the sliding groove 321*e* but much smaller than a length of the sliding groove 321*e*. Through the cooperation of the first shaft 40*e* and the sliding groove 321*e*, the swing arm 32*e* can slide relative to the first shaft 40*e* along its length direction; and the swing arm 32*e* and the first shaft 40*e* are relatively fixed in the width direction of the swing arm 32*e*. In the illustrated embodiment, the shell 10*e* is provided with a first support seat 18*e* at a position corresponding to the first shaft 40*e*, and an end of the first shaft 40*e* extends beyond the sliding groove 321*e* and is inserted into the first support seat 18*e*.

Figure 19:
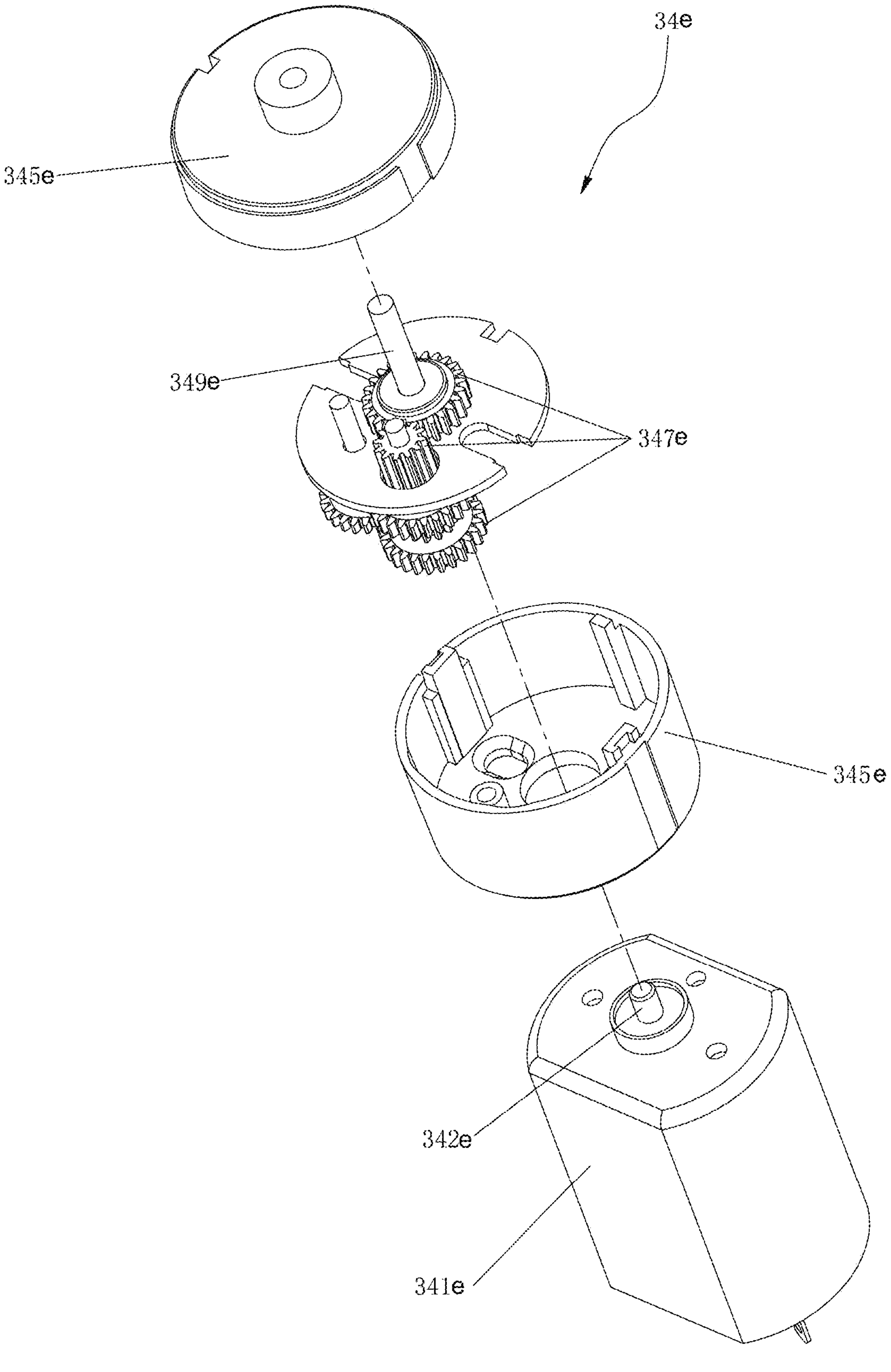
FIG. 19 is a further exploded view of a gearbox of the driving mechanism of FIG. 15.

In an embodiment, the second driving mechanism 30*e* further includes a gearbox 34*e* and a rotary member 36*e* connected to the gearbox 34*e* for power transmission. Referring to FIG. 19, the gearbox 34*e* includes a motor 341*e* and a gear unit 343*e*. The motor 341*e* serves as a driving component of the massage device 100*e* and has an output shaft 342*e* rotating at high-speed. The gear unit 343*e* includes a gear housing 345*e* and a plurality of gears 347*e* arranged in the gear housing 345*e*. The gears 347*e* mesh with each other, and a reduction ratio of the whole gear unit 343*e* can be determined according to the gear ratios between the meshed gears 347*e*. In an embodiment, the reduction ratio of the gear unit 343*e* is not less than 4:1 and not more than 100:1, and an output speed of the gearbox 34*e* is not exceed 1000 rpm. That is, a speed of an output shaft 349*e* of the gearbox 34*e* does not exceed 1000 rpm.

The rotary member 36*e* is connected to the output shaft 349*e* of the gearbox 34*e* in a transmission way. Under the driving of the gearbox 34*e*, the rotary member 36*e* rotates about the axis O, wherein the axis O may be a central axis of the rotary member 36*e*. Preferably, a speed of the rotary member 36*e* does not exceed 1000 rpm. The shell 10*e* is provided with a second support seat 19*e* at a position corresponding to the rotary member 36*e*, and a rotating shaft 361*e* extends outwardly from the rotary member 36*e* into the second support seat 19*e*. Preferably, the rotating shaft 361*e* is rotatably inserted into the second support seat 19*e*. The second shaft 42*e* is eccentrically arranged on the rotary member 36*e*, and rotates around the axis O under the driving of the gearbox 34*e*.

In an embodiment, the second shaft 42*e* and the rotary member 36*e* may be integrally formed as one piece. The another end of the swing arm 32*e*, which is away from the second massage portion 14*e*, is provided with a shaft hole 323*e*, and the second shaft 42*e* may be rotatably inserted into the shaft hole 323*e*. Preferably, a fixing hole 44*e* is provided in the second shaft 42*e*, and a rod portion of the fixing member 46*e*, such as pins, rivets, screws, etc., is inserted into the fixing hole 44*e* of the second shaft 42*e*, and a head portion of the fixing member 46*e* abuts against the swing arm 32*e* at a periphery of the shaft hole 323*e*, so as to fix the second shaft 42*e* and the swing arm 32*e* in the Z-direction. In this way, the second shaft 42*e* will not automatically detach from the shaft hole 323*e* of the swing arm 32*e*, ensuring the connection stability between the swing arm 32*e* and the rotary member 36*e*.

In some embodiments, the second shaft 42*e* may be integrally formed on the swing arm 32*e*, and a shaft hole may be formed on the rotary member 36*e* corresponding to the second shaft 42*e*. Alternatively, the second shaft 42*e* may be formed separately and then pivotally connected to the swing arm 32*e* and/or the rotary member 36*e*.

When the gearbox 34*e* is started, the output shaft 342*e* of the motor 341*e* rotates at high speed. After being slowed down by the gear unit 343*e*, the rotary member 36*e* rotates at an appropriate speed, such as no more than 1000 rpm. The second shaft 42*e* rotates around the axis O, driving the swing arm 32*e* to rotate. The swing arm 32*e* generates displacement in both its length and width directions. Due to the engagement between the first shaft 40*e* and the sliding groove 321*e*, the movement of the swing arm 32*e* in its length direction is not restricted, allowing the swing arm 32*e* to slide along its sliding groove 321*e* relative to the first shaft 40*e*; and the movement of the swing arm 32*e* in its width direction is limited by the first shaft 40*e*, causing the swing arm 32*e* to rotate relative to the second shaft 42*e* and thus generate swing.

Figure 20:
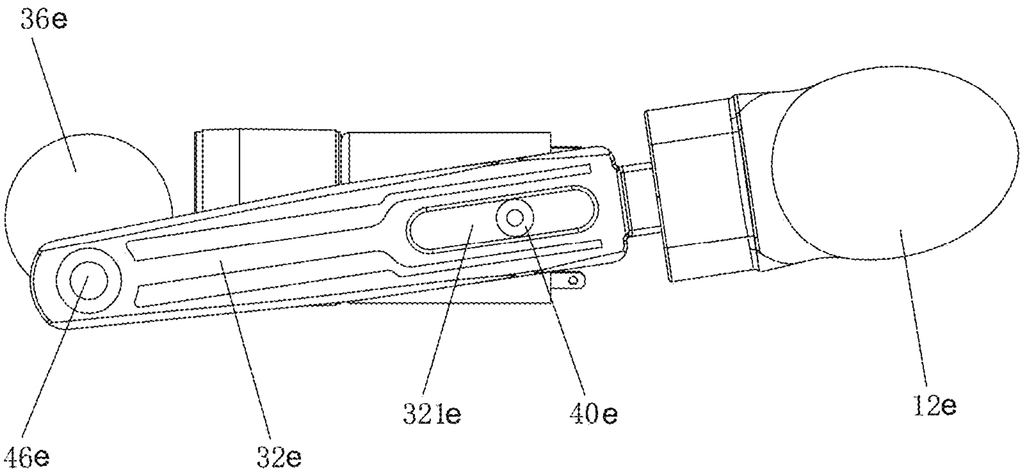
FIG. 20 is a schematic view of a first intermediate state of the second massage portion.
Figure 21:
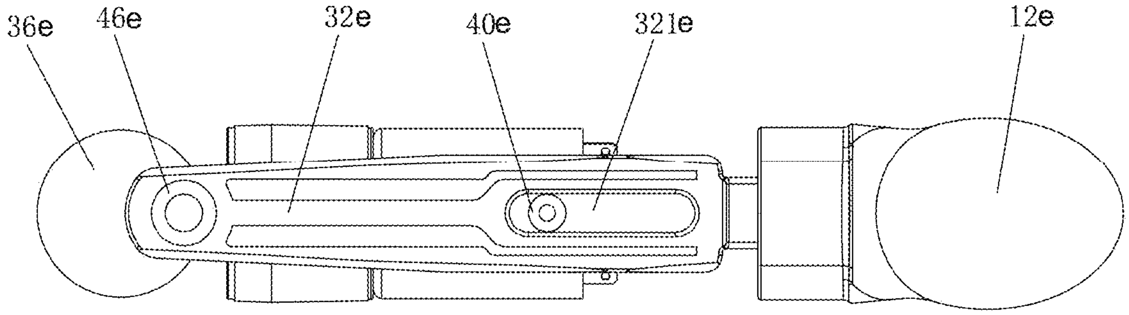
FIG. 21 is a schematic view of a second intermediate state of the second massage portion.
Figure 22:
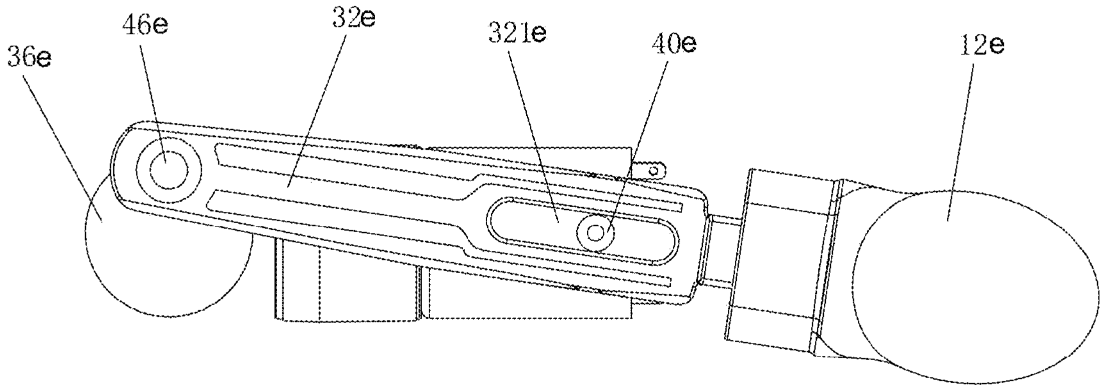
FIG. 22 is a schematic view of a third intermediate state of the second massage portion.
Figure 23:
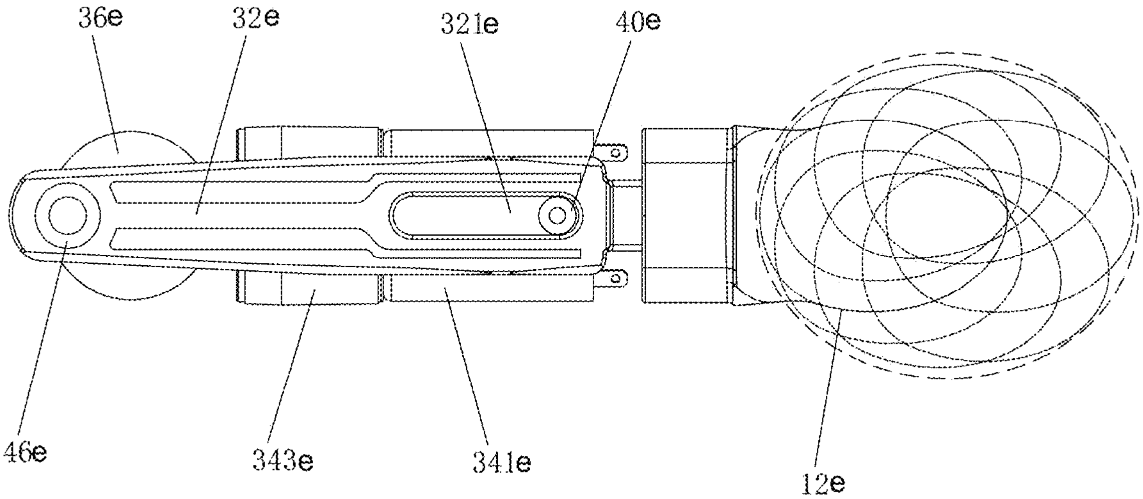
FIG. 23 is a schematic view of trajectory of the second massage portion.
Figure 24:
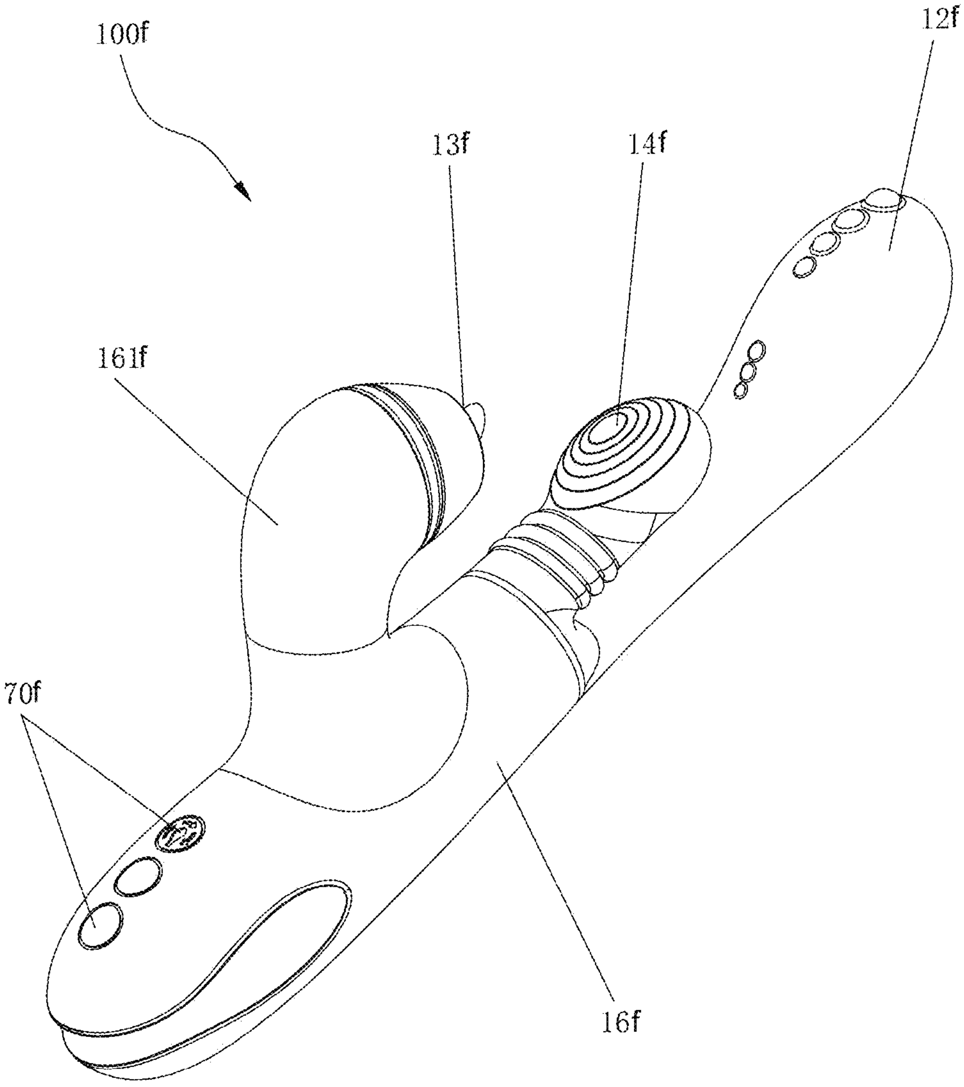
FIG. 24 is a schematic, assembled view of a massage device according to a sixth embodiment of the present application.
Figure 25:
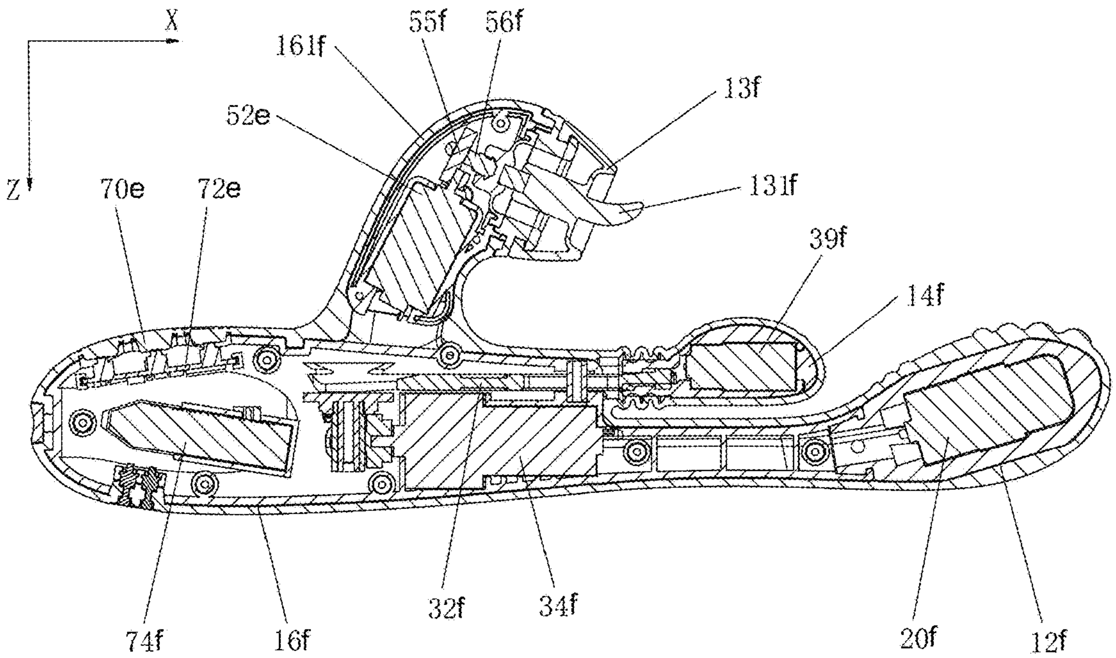
FIG. 25 is a cross sectional view of the massage device of FIG. 24.

As shown in FIGS. 20-22, as the rotation angle of the second shaft 42*e* around the axis O changes, the swinging center of the swing arm 32*e* continuously changes. The swing arm 32*e* simultaneously generates two different reciprocating movements, namely the linear reciprocating movement of the swing arm 32*e* in the X-direction and the reciprocating swing of the swing arm 32*e* in the XY-plane. The combination of these two reciprocating movements drives the second massage portion 14*e* connected to the swing arm 32*e* to move along a circular or elliptical trajectory in the XY-plane, as shown by the dashed line in FIG. 23.

Preferably, the length of the swing arm 32*e* is not less than 2 centimeters, allowing the swing arm 32*e* and the second massage portion 14*e* connected to the swing arm 32*e* to have a larger stroke, thereby an area of the human body kneaded by the second massage portion 14*e* being enlarged and accordingly a stimulation effect being better. In an embodiment, the trajectory of the second massage portion 14*e* is substantially an elliptical trajectory, and the major axis of the elliptical trajectory is not less than 1 centimeter. In another embodiment, the trajectory of the second massage portion 14*e* is substantially a circular trajectory, and the diameter of the circular trajectory is not less than 1 centimeter.

Compared to the existing massage devices which stimulate the human body by hitting in high-frequency, the second massage portion 14*e* of the present massage device moves along an annular trajectory, and thus kneads the sensitive area of the human body. An area of the human body kneaded by the second massage portion 14*e* is enlarged and accordingly a stimulation effect is better. Moreover, the second massage portion 14*e* kneads the human body, which is similar to the motion of the hand, providing a more comfortable sexual experience.

Figure 16:
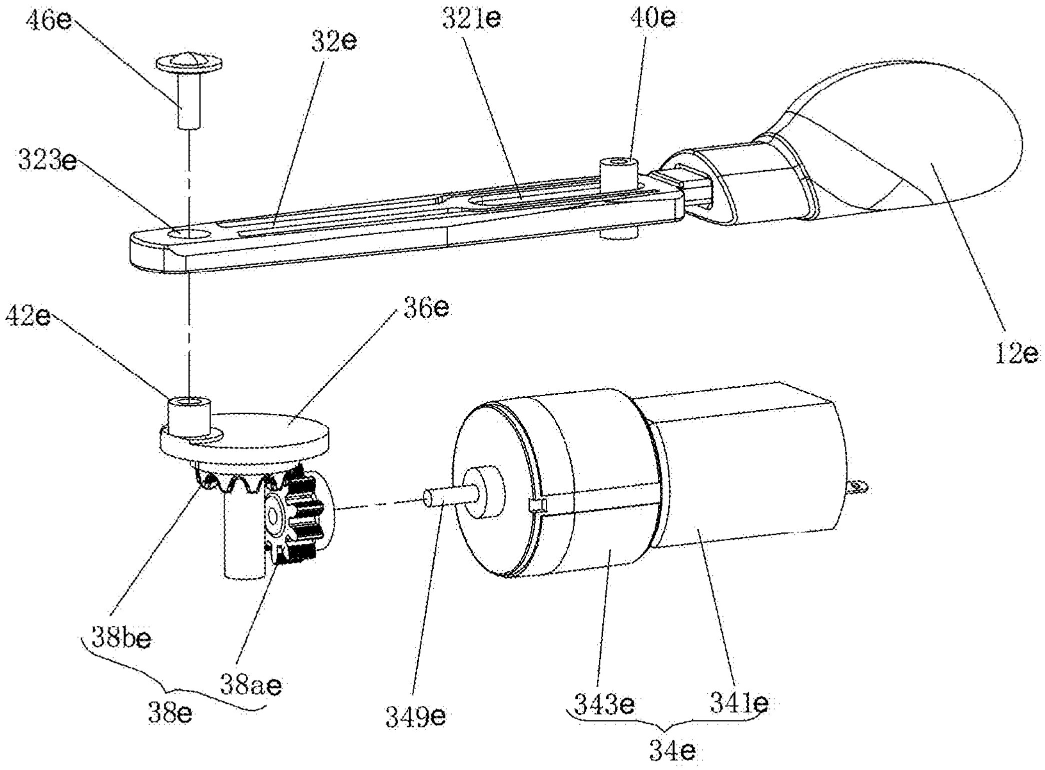
FIG. 16 is an exploded view of FIG. 15.
Figure 17:
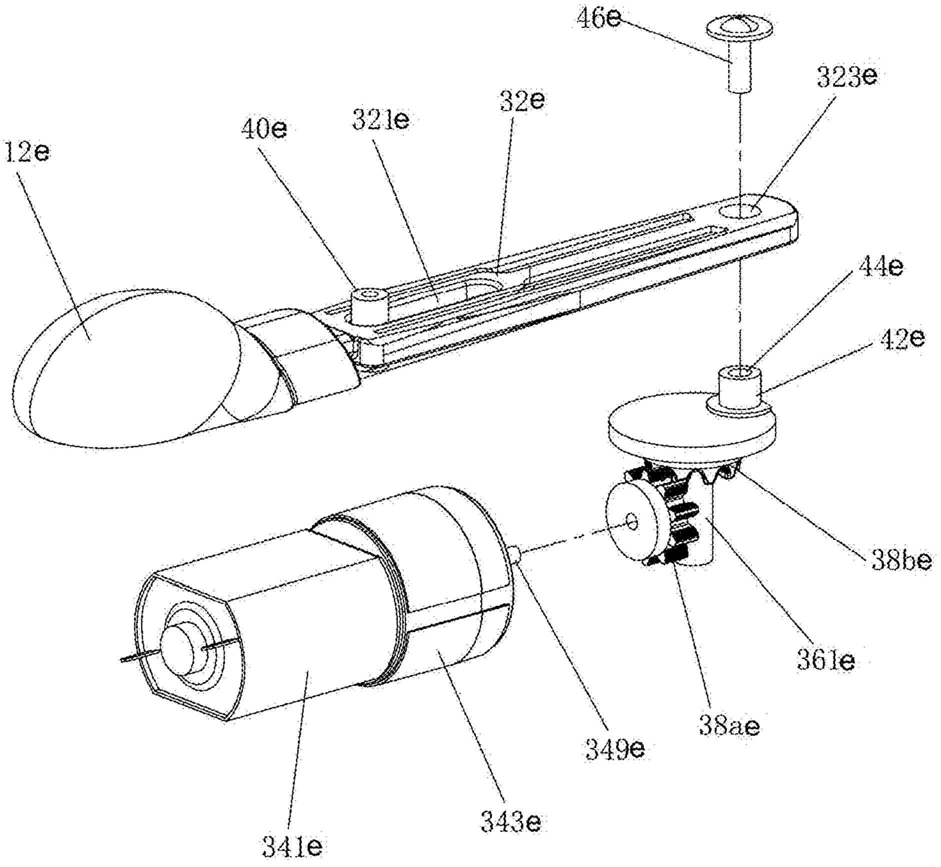
FIG. 17 is an exploded view of FIG. 15 shown from another aspect.
Figure 18:
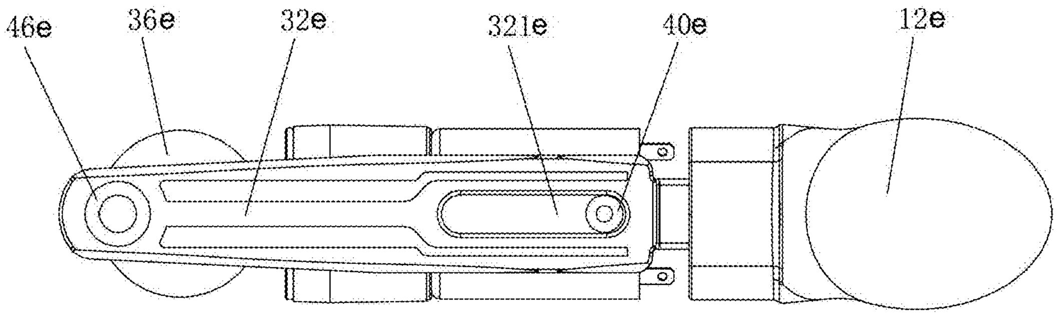
FIG. 18 is a top plan view of FIG. 15.

In an embodiment, as shown in FIGS. 16-17, a steering unit 38*e* is provided between the rotary member 36*e* and the gearbox 34*e*. By means of the steering unit 38*e*, the direction of power transmission may be changed, facilitating the arrangement of the gearbox 34*e*. In the illustrated embodiment, the gearbox 34*e* is arranged with its output shaft 349*e* being generally parallel to the swing arm 32*e*. The steering unit 38*e* is located at an axial end of the gearbox 34*e* and the swing arm 32*e*. In this way, a space below the swing arm 32*e* may be utilized to set the gearbox 34*e*, which is conducive to the miniaturization of the device.

Specifically, the steering unit 38*e* is a steering gear unit, and includes a plurality of gears that mesh with each other, such as a first gear 38*ae*, a second gear 38*be*, and etc. The first gear 38*ae* is mounted around the output shaft 349*e* of the gearbox 34*e*, preferably the first gear 38*ae* and the gearbox 34*e* are arranged coaxially. The second gear 38*be* is mounted around the rotating shaft 361*e* of the rotary member 36*e*, preferably the second gear 38*be* and the rotary member 36*e* are integrally formed as on piece. The first gear 38*ae* and the second gear 38*be* may be bevel gears and mesh with each other, achieving a change of 90 degrees in the direction of power transmission between the gearbox 34*e* and the rotary member 36*e*.

In other embodiments, the direction of power transmission can be determined based on the internal space of the massage device 100*e*, and the angle that needs to be changed is not limited to 90 degrees. Users can choose corresponding type of steering unit according to their needs to achieve direction change, which should not be limited by specific embodiments. In some embodiments, the steering unit 38*e* may also be integrated inside the gearbox 32*e*, thereby a separate steering unit is no longer needed. Alternatively, in some embodiments, there is no need for direction change between the gearbox 34*e* and the rotary member 36*e*, and thus the steering unit 38*e* may be omitted.

As shown in FIGS. 13-14, the second driving mechanism 30*e* may further include a second vibration motor 39*e* set in the second massage portion 14*e*. The second massage portion 14*e* is driven by the gearbox 34*e* to move in a circular trajectory, and also vibrates at a predetermined frequency under the action of the second vibration motor 39*e*. In this way, while kneading the stimulated area, the second massage portion 14*e* may generate deep stimulation on the stimulated area through vibration, generating a dual stimulation effect on the human body, and accordingly having a better stimulation effect.

In an embodiment, the shell body 16*e* may serve as a handle of the massage device 100*e*, facilitating holding and operation. The shell body 16*e* is provided with buttons 70*e* thereon, which may be touch type buttons and/or mechanical buttons. The shell body 16*e* is provided with a control circuit board 72*e* therein, which forms a control circuit with the gearbox 34*e*, the first vibration motor, the second vibration motor 39*e*, and etc. The user can control the operation of the massage device 100*e* through the buttons 70*e*, including controlling the speed and direction of the gearbox 34*e*, the vibration frequency of the first vibration motor and the second vibration motor 39*e*, and etc. A battery 74*e*, preferably a rechargeable battery, is provided inside the shell body 16*e*. The battery 74*e* is connected to the control circuit board 72*e* electrically and serves as a power source of the massage device 100*e*.

In an embodiment, as shown in FIGS. 13-14, the shell 10*e* may be a double-layer structure, and includes an inner shell 10*ae* and an outer shell 10*be* enclosing the inner shell 10*ae*. The inner shell 10*ae* is made of hard materials such as plastic, metal, etc., which has a relatively high strength and thus provides support for the components mounted inside the shell 10*e*, such as the first driving mechanism 20*e*, the second driving mechanism 30*e*, and etc. The outer shell 10*be* is made of flexible materials such as silicone, rubber, and etc., and has a soft touch. Preferably, after the inner shell 10*ae* being assembled with the first driving mechanism 20*e*, the second driving mechanism 30*e*, etc., the outer shell 10*be* is formed on the inner shell 10*ae* integrally through overmolding, achieving good sealing effect for the components inside the shell 10*e*. The outer shell 10*be* plays a waterproof and dustproof role, facilitating the cleaning and storage of the massage device 100*e*.

As shown in FIG. 13, the first massage portion 12*e* and the second massage portion 14*e* are both double-layer structures. The first massage portion 12*e* includes a first hard layer 12*ae* and a first soft layer 12*be* covered on the first hard layer 12*ae*. The second massage portion 14*e* includes a second hard layer 14*ae* and a second soft layer 14*be* covered on the second hard layer 14*ae*. The hard layers 12*ae*, 14*a* may be part of the inner shell 10*ae*, while the soft layers 12*be*, 14*be* may be part of the outer shell 10*be*.

The end of the swing arm 32*e* is inserted into the second hard layer 14*ae* of the second massage portion 14*e*, and is fixedly connected to the second hard layer 14*ae* through snap-fitting, welding, bonding, interference fitting, and etc., so as to drive the entire second massage portion 14*e* to move. The second hard layer 14*ae* can better transmit the force of the swing arm 32*e* to the second massage portion 14*e*, allowing the second massage portion to have a larger swing and/or movement range, thereby having a larger stimulation range. The second soft layer 14*be* provides a soft touch and a certain buffer for the second massage portion 14*e*, making the stimulated area of the human body more comfortable. Preferably, the end of the swing arm 32*e* can be integrally fixed in the second hard layer 14*ae* during the process of forming the second soft layer 14*be*, which not only simplifies production and assembly, but also enhances the connection strength between the second massage portion 14*e* and the swing arm 32*e*.

In this embodiment, the second soft layer 14*be* of the second massage portion 14*e* is integrally connected to the outer shell 10*be* corresponding to the shell body 16*e*, and wrinkles 15*e* are formed at a joint of the second soft layer 14*be* and the outer shell 10*be*. The second hard layer 14*ae* of the second massage portion 14*e* is disconnected from the inner shell 10*ae* at a position corresponding to the wrinkles 15*e*, making the second massage portion 14*e* be easier to deform during movement for the wrinkles 15*e* at the joint of the second massage portion 14*e* and the outer shell 10*be*. The second massage portion 14*e* thus may have a larger swing and/or movement amplitude, thereby having a larger stimulation range.

In this embodiment, an outer, lateral surface of the second massage portion 14*e* away from the first massage portion 12*e*, such as the upper surface of the second massage portion 14*e* in FIGS. 11-14, serves as a massage surface 141*e* of the second massage portion 14*e*, for kneading the stimulated area that is in contact with it. When in use, unlike the point-to-point hitting of existing massage devices, the second massage portion 14*e* always maintains surface contact with the stimulated area, such as the vaginal wall, the rectum wall, and etc., and a contact position is constantly changing, achieving the effect of kneading. Preferably, the massage surface 141*e* of the second massage portion 14*e* is a convex surface, which can better interact with the stimulated area.

In the embodiments shown in FIGS. 11-14, there are protrusions 125*e* provided on an outer surface of the first massage portion 12*e*, so as to enhance the stimulation effect to the vaginal wall or the rectum wall. The massage surface 141*e* of the second massage portion 14*e* is provided with patterns 143*e*, such as annular patterns, to enhance the stimulating effect to the vaginal wall or the crus of clitoris. In other embodiments, the outer surface of the first massage portion 12*e* may have patterns formed thereon, and the massage surface 141*e* of the second massage portion 14*e* may have protrusions formed thereon. The protrusions, patterns, and etc. may be formed on the entire outer surface of the first massage portion 12*e* and/or the second massage portion 14*e*, or may be formed on a portion of the outer surface of the first massage portion 12*e* and/or the second massage portion 14*e*.

It should be understood that under the driving of the first driving mechanism 20*e* and the second driving mechanism 30*e*, the first massage portion 12*e* and the second massage portion 14*e* themselves can generate sufficient stimulation to the human body.

Figure 28:
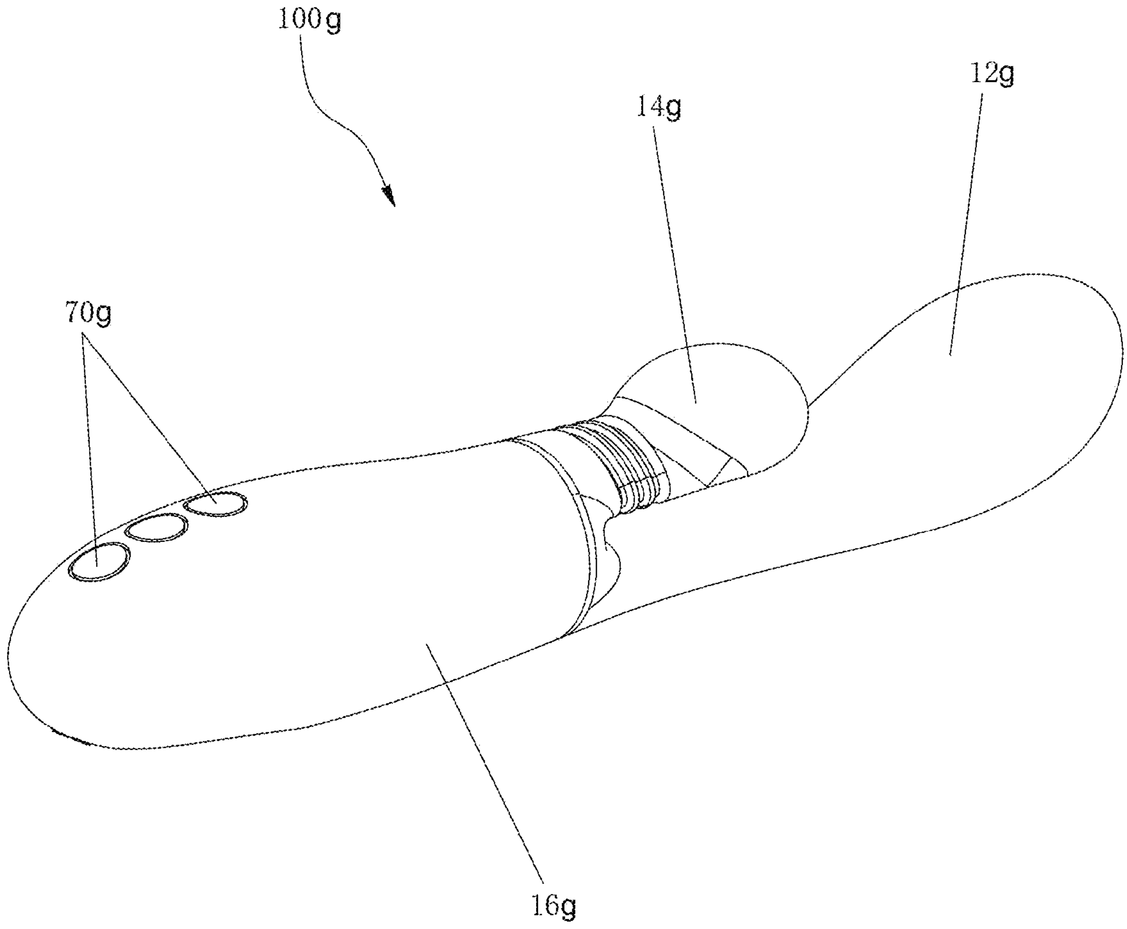
FIG. 28 is a schematic, assembled view of a massage device according to a seventh embodiment of the present application.

In a seventh embodiment, a massage device 100*g* includes a shell 10*g*. The shell 10*g* having a first massage portion 12*g* and a second massage portion 14*g*. The outer surfaces of the first massage portion 12*g* and/or the second massage portion 14*g* may be smooth surfaces, as shown in FIG. 28. The shell 10*g* is generally elongated and rod-shaped, and further includes a shell body 16*g*. The shell body 16*g* is provided with buttons 70*g* thereon, which may be touch type buttons and/or mechanical buttons.

Figure 29:
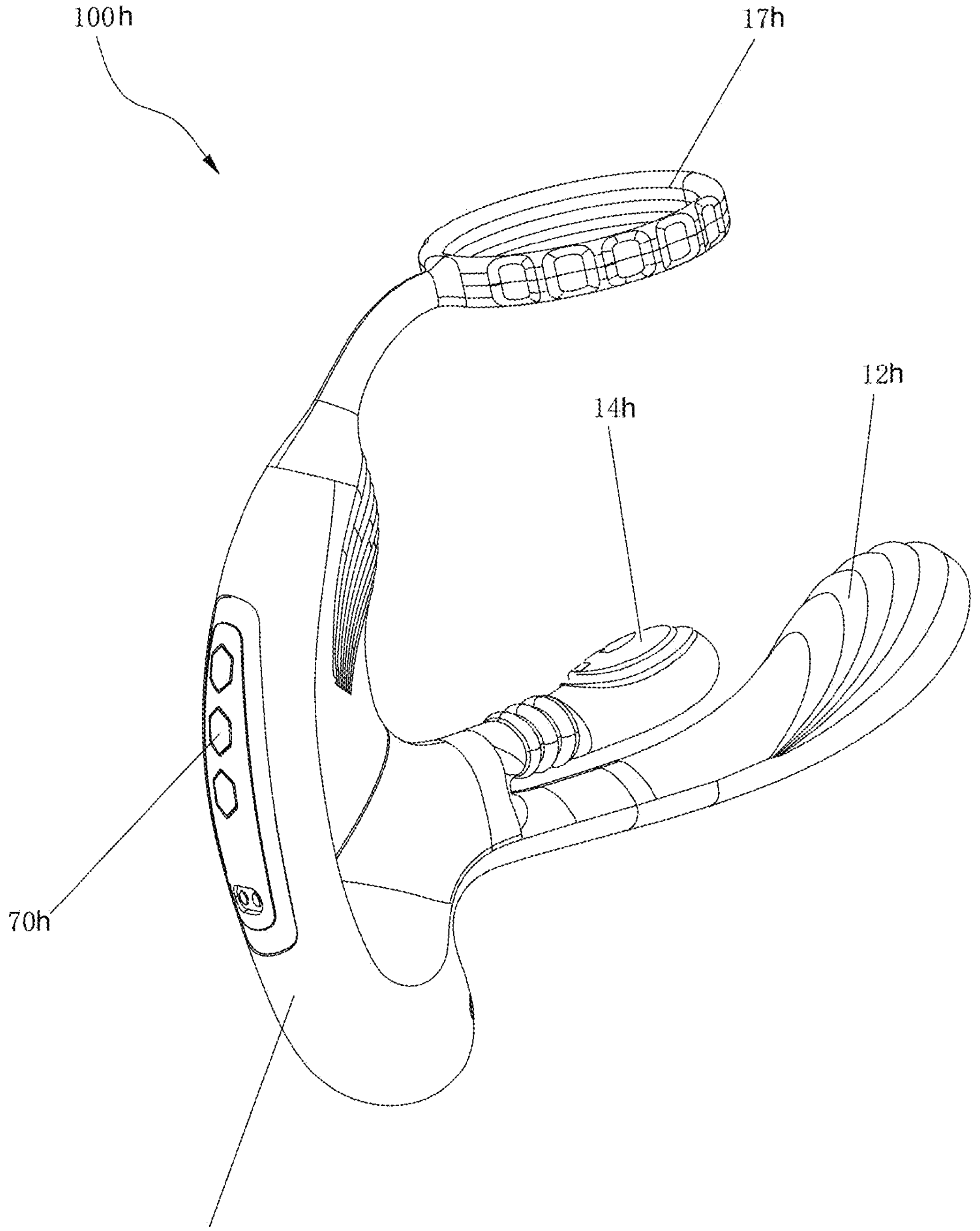
FIG. 29 is a schematic, assembled view of a massage device according to an eighth embodiment of the present application.

In an eighth embodiment, as shown in FIG. 29, a massage device 100*h* includes a shell 10*h*. The shell 10*g* having a first massage portion 12*h* and a second massage portion 14*h*. The shell 10*h* further includes a shell body 16*h*. The shell body 16*h* is provided with buttons 70*h* thereon, which may be touch type buttons and/or mechanical buttons. An annular ring 17*h* is provided on the shell body 16*h* of the massage device 100*h*. The annular ring 17*h* may be formed separately and then connected to the shell body 17*h*, or may be formed integrally with the shell body 17*h*. The massage device 100*e* may be fixed onto the human body, such as on the penis or the scrotums, by the annular ring 17*h*.

In the above embodiment, the entire outer shell 10*be* of the shell 10*e*, 10*g*, 10*h* is an integrated structure made of flexible materials such as rubber, silicone, and etc., so that the outer layers of the first massage portion 12*e*, 12*g*, 12*h* and the second massage portion 14*e*, 14*g*, 14*h*, namely the soft layers 12*be* and 14*be*, have a soft touch, increasing the comfort of use. In other embodiments, the outer layers of the first massage portion 12*e*, 12*g*, 12*h* and the second massage portion 14*e*, 14*g*, 14*h* may be made of other flexible materials that can directly contact the skin, which is not limited in the present application. Furthermore, it should be noted that as long as the outer layers of the first massage portion 12*e*, 12*g*, 12*h* and the second massage portion 14*e*, 14*g*, 14*h* are soft layers, the outer layer of the shell body 16*e* may be either a soft layer or a hard layer.

During the use of the massage device 100*e*, the user may activate the first driving mechanism 20*e* to achieve a stimulation effect to the vagina through the high-frequency vibration of the first massage portion 12*e*; or, the user may activate the second vibration motor 39*e* of the second driving mechanism 30*e* to achieve a stimulation effect to the crus of clitoris through the high-frequency vibration of the second massage portion 14*e*; or, the user may activate the gearbox 34*e* of the second driving mechanism 30*e* to achieve a kneading effect to the crus of clitoris through the movement of the second massage portion 14*e*; or, the user may simultaneously activate multiple or all of the teeth box 34*e*, first vibration motor, and second vibration motor 39*e* to experience a multi-stimulation effect to the vagina and the crus of clitoris, which is convenient in use.

Referring to FIGS. 24-27, a massage device according to a sixth embodiment of the present application is shown. In this embodiment, the massage device 100*f* includes a shell 10*f* being provided with a first massage portion 12*f*, a second massage portion 14*f*, and a third massage portion 13*f*, and a first driving mechanism 20*f*, a second driving mechanism 30*f*, and a third driving mechanism 50*f* mounted in the shell 10*f*. The first driving mechanism 20*f* is used to drive the first massage portion 12*f*, the second driving mechanism 30*f* is used to drive the second massage portion 14*f*, and the third driving mechanism 50*f* is used to drive the third massage portion 13*f*. Among them, the first massage portion 12*f*, the second massage portion 14*f*, the first driving mechanism 20*f*, and the second driving mechanism 30*f* are generally the same as the forgoing embodiments, and will not be described here.

In this embodiment, a branch 161*f* extends upwardly and slightly forwardly from the shell body 16*f*, and the third massage portion 13*f* is provided at a distal end of the branch 161*f*. In the X-direction, the third massage portion 13*f* is not exceed the position of the second massage portion 14*f*. In the Z-direction, the third massage portion 13*f* is located above the second massage portion 14*f* and is separated from the second massage portion with a certain distance, thereby forming a space therebetween to accommodate a part of the human body, such as the vulva of the woman. Preferably, the distance between the third massage portion and the second massage portion 14*f* is much greater than the distance between the second massage portion 14*f* and the first massage portion 12*f*. In this embodiment, the third driving mechanism 50*f* is arranged in the branch 161*f* of the shell 10*e* and connected to the third massage portion 13*f* in a transmission way.

Figure 26:
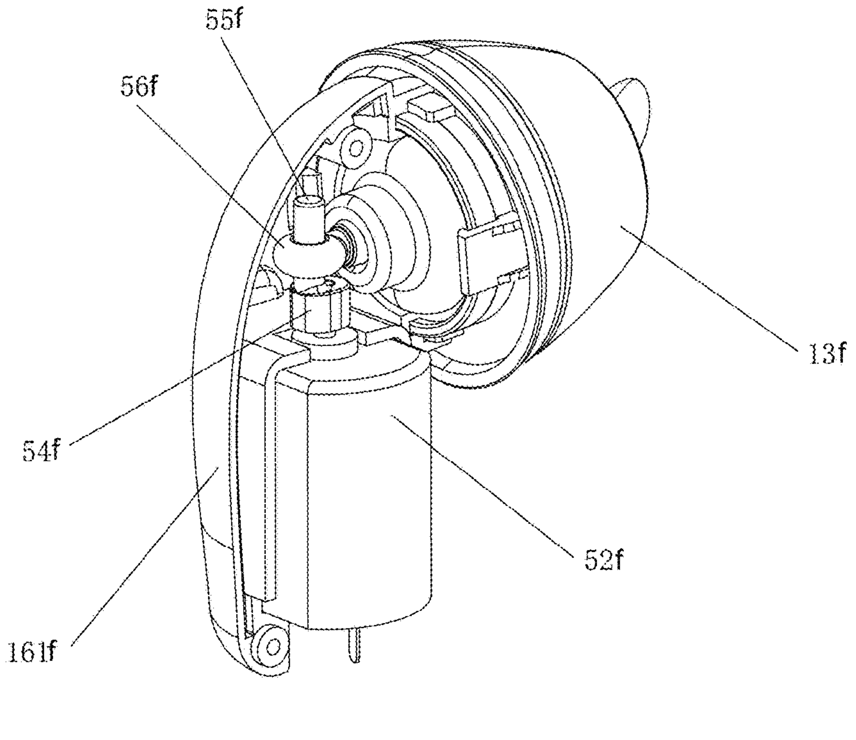
FIG. 26 is a schematic view of a third driving mechanism of the massage device of FIG. 25.
Figure 27:
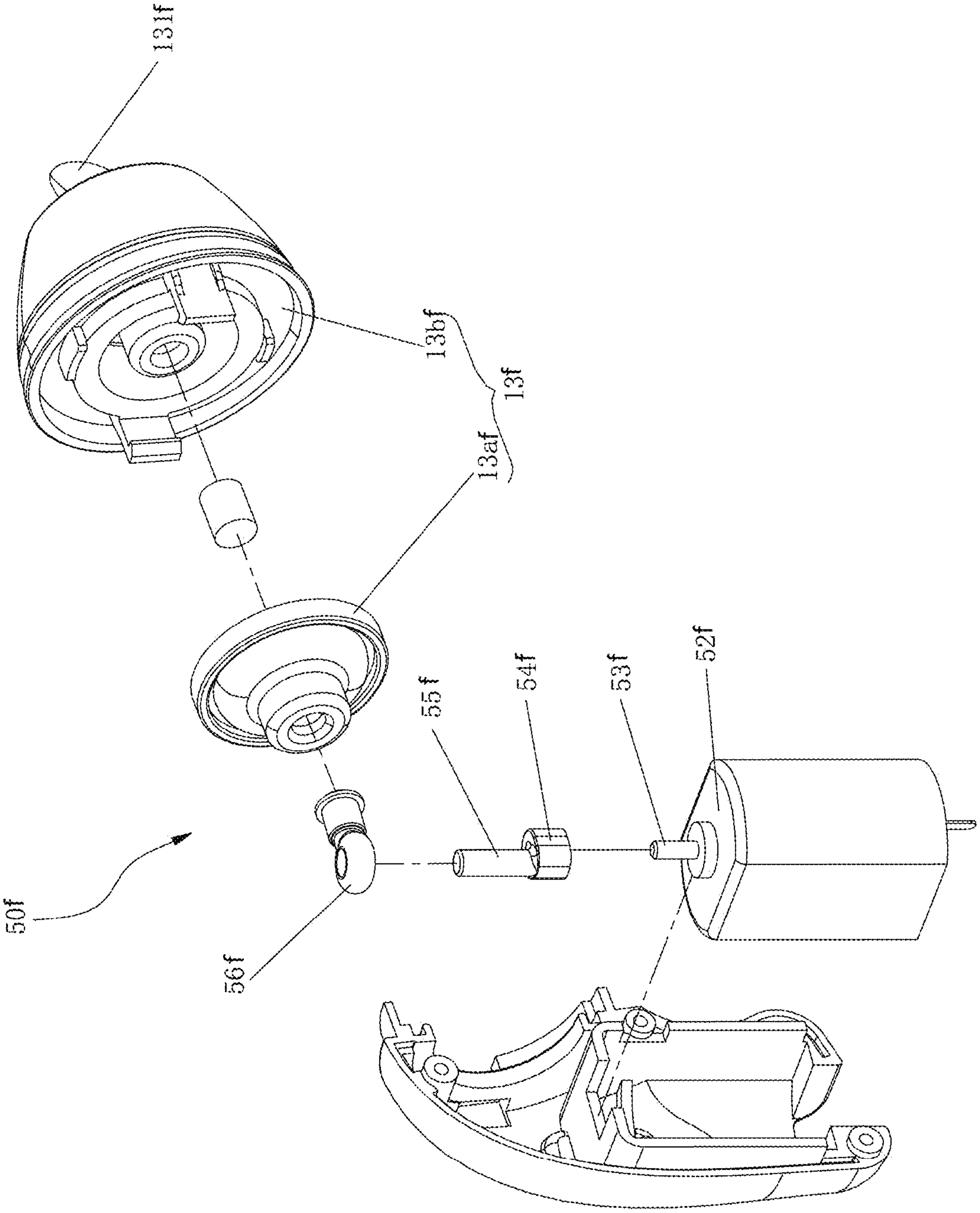
FIG. 27 is an exploded view of the third driving mechanism of FIG. 26.

As shown in FIGS. 26-27, the third driving mechanism 50*f* includes a gearbox 52*f*, an eccentric wheel 54*f* driven by the gearbox 52*f*, and a connecting rod 56*f* connected between the eccentric wheel 54*f* and the third massage portion 13*f*. The eccentric wheel 54*f* is connected to an output shaft 53*f* of the gearbox 52*f* and rotates at an appropriate speed under the driving of the gearbox 52*f*. The eccentric wheel 54*f* is provided with a pivot 55*f*, which is arranged eccentrically relative to a rotary axis of the eccentric wheel 54*f*, so that the pivot 55*f* rotates around the rotary axis of the eccentric wheel 54*f*. One end of the connecting rod 56*f* is rotatably connected to the pivot 55*f*, and the other end of the connecting rod 56*f* is fixedly inserted into the third massage portion 13*f*, so that the gearbox 52*f* can drive the third massage portion 13*f* to swing through the eccentric wheel 54*f*.

In this embodiment, the third massage portion 13*f* is a double-layer structure, including a third hard layer 13*af* and a third soft layer 13*bf* covered on the third hard layer 13*af*. The third hard layer 13*af* may be a part of the inner shell 10*af*, and the third soft layer 13*bf* may be a part of the outer shell 10*bf*. The connecting rod 56*f* is connected to the third hard layer 13*af*, wherein the connecting rod 56*f* and the third hard layer 13*af* may be tightly fitted. A tongue 131*f* extends outward from a central portion of the third soft layer 13*bf*, for licking the vulva of the human body, particularly the clitoris. When the gearbox 52*f* is started, the pivot 55*f* rotates around the rotary axis of the eccentric wheel 54*f*, causing the connecting rod 56*f* to move back and forth in its axial direction and swing back and forth around the pivot 55*f*, thereby driving the tongue 131*f* of the third massage portion 13*f* to move along a circular trajectory, which may also have a large stimulation range. The massage device 100*e* of this embodiment includes three massage portions 12*f*, 14*f*, and 13*f*, which are respectively driven by three driving mechanisms 20*f*, 30*f*, and 50*f*. It can simultaneously stimulate three parts of the human body, with a larger stimulation range and better stimulation effect, further improving the user experience.

Ninth Embodiment

Figure 30:
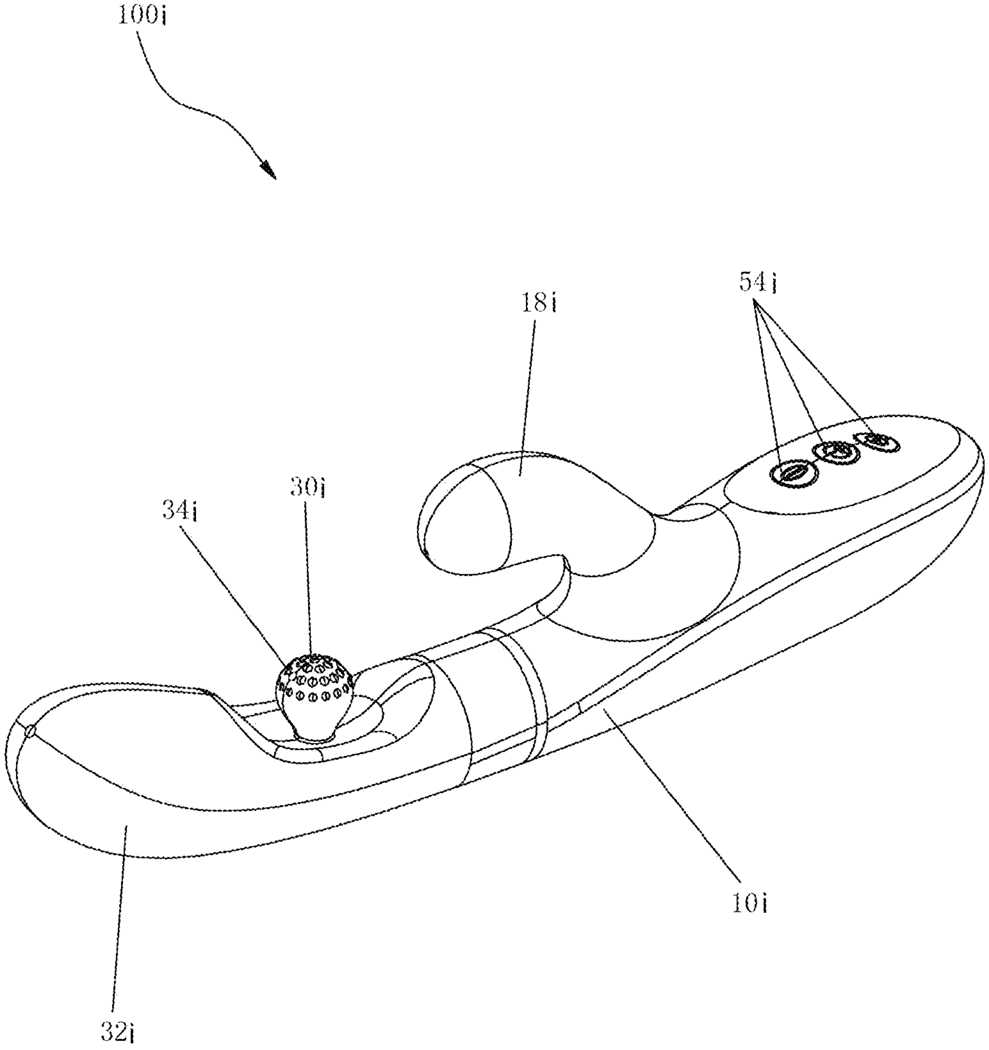
FIG. 30 is a schematic, assembled view of a massage device according to a ninth embodiment of the present application.
Figure 31:
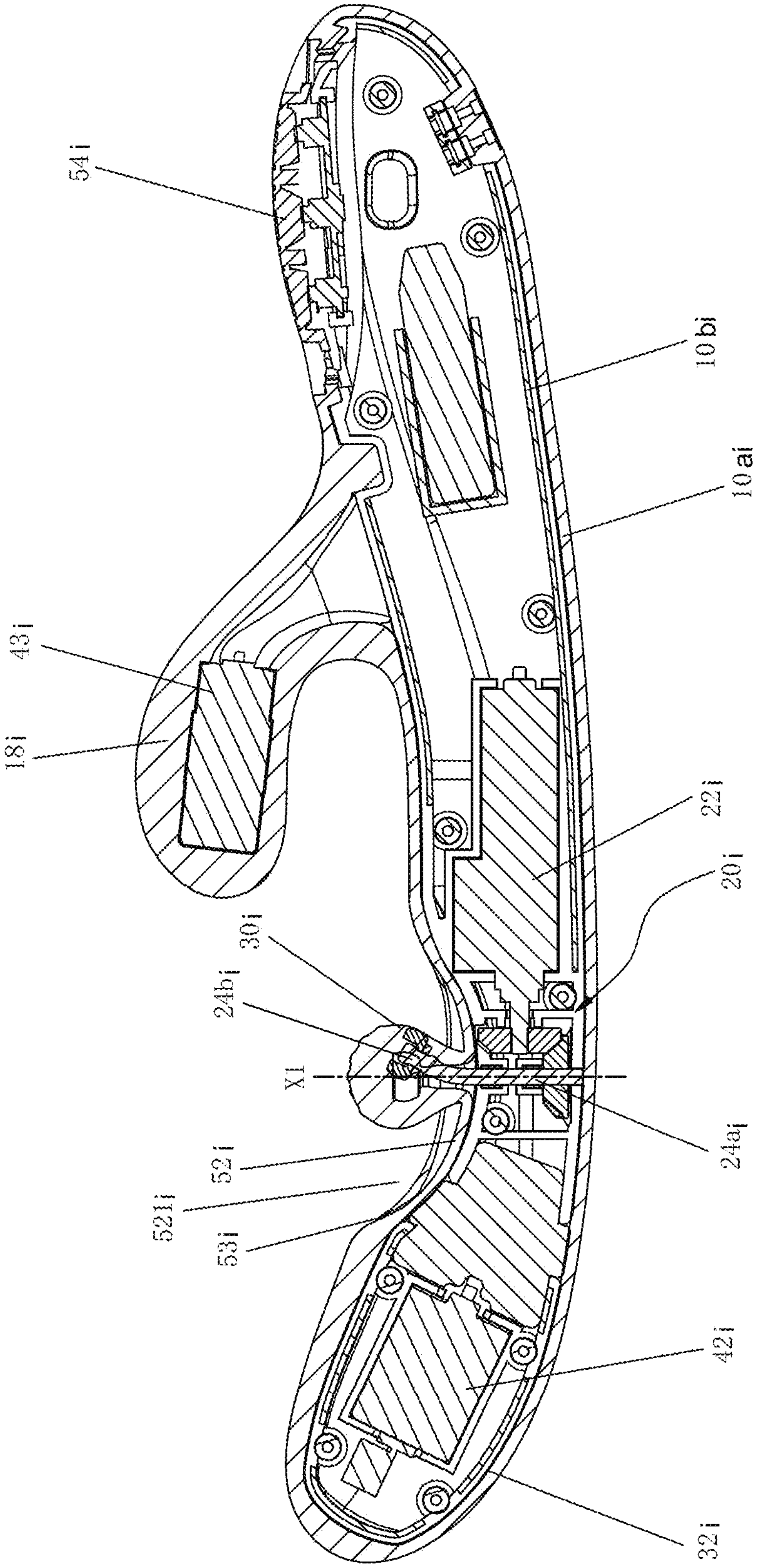
FIG. 31 is a cross sectional view of the massage device of FIG. 30.

FIGS. 30-31 show a ninth embodiment of the massage device of the present application. In this embodiment, the massage device 100*i* includes a shell 10*i* and a driving mechanism 20*i* arranged in the shell 10*i*. The shell 10*i* of the massage device 100*i* is generally elongated and rod-shape. The shell 10*i* is provided with a massage portion 30*i* and a massage end 32*i*, and the driving mechanism 20*i* is connected to the massage portion 30*i* in a transmission way. Under the action of the driving mechanism 20*i*, the massage portion 30*i* rotates around a first axis X1 to form an annular trajectory. The massage end 32*i* is formed at a front end of the shell 10*i*. A branch 18*i* extends from the middle portion of the shell 10*i* curvedly towards an upper side of a front end of the shell 10*i*, and the massage portion 30*i* is between the branch 18*i* and the massage end 32*i*.

In this embodiment, the shell 10*i* further includes a holding end, and the holding end is defined on a rear end of the shell 10*i* thus facilitating to grab the shell 10*i*. In this embodiment, the massage portion 30*i* is generally spherical-shaped or ellipsoidal-shaped.

In this embodiment, a base portion 52*i* is formed on the shell 10*i*. One end of the massage portion 30*i* serving as a connecting end is connected to the base portion 52*i*, and another end of the massage portion 30*i* serving as a free end. Specifically, the base portion 52*i* is concaved inwardly recessed to form a bowl-shaped portion which is arranged around the first axis X1, wherein the first axis X1 is generally perpendicular to a longitudinal direction of the shell 10*i*. The massage portion 30*i* is set in the base portion 52*i*, with one end thereof serving as a connecting end for connecting a central, bottom of the base portion 52*i*. The massage portion 30*i* extends partly beyond the base portion 52*i* through an open side 521*i* of the base portion 52*i*. When the massage portion 30*i* is driven to rotate, it swings in the base portion 52*i* with its connecting end as the center. It should be understood that the base portion 52*i* may be other shape, such as a protrusion and a column being as high as the holding end. Preferably, protruding dots 34*i* are provided on an outer surface of the massage portion 30*i* to enhance the stimulation effect of the massage portion 30*i*.

In this embodiment, the shell 10*i* may be a double-layer structure, and includes an outer layer 10*ai* and an inner layer 10*bi* inside the outer layer 10*ai*. The outer layer 10*ai* is made of soft material, and the inner layer 10*bi* is made of hard materials such as plastic, metal, etc. The inner layer 10*bi* provides support for the outer layer 10*ai* and the driving mechanism 20*i*. In this embodiment, the massage portion 30*i* may be a single-layer structure, and includes the outer layer 10*ai*.

In this embodiment, the outer layer 10*ai* of the massage portion 30*i*, the outer layer 10*ai* of the base portion 52*i* and outer layer 10*ai* of the rest of the shell 10*i* are integrally formed, thus not only simplifying production and assembly of the massage device 100*i*, but also improving the connection strength between the massage portion 30*i* and the outer layer 10*ai*. During rotation of the massage portion 30*i* around the first axis X1, it can generate greater deformation without damage, further increasing the stimulation force and stimulation range of the massage portion 30*i* on the human body. In addition, the outer layer 10*ai* encloses the inner layer 10*bi*, which can achieve good sealing effect for the components inside the shell 10*i*, thereby play a waterproof and dustproof role, and facilitating the cleaning and storage of the massage device 100*i*. For the massage device 100*i* of the present application, it should be understood that the massage portion 30*i* and the outer layer 10*ai* of shell 10*i* may be formed separately and then assembled together, so that the massage portion 30*i* can be selectively disassembled and replaced. In practical applications, the massage device 100*i* can be formed with several massage portions 30*i* in different shapes and/or sizes. According to specific usage scenarios, the user can choose a corresponding massage portion 30*i* to ensure the stimulation effect. In this situation, the outer layer 10*ai* is no longer limited to be formed by the same material as that of the massage portion 30*i*. Soft materials such as silicone and rubber, as well as hard materials such as plastic and alloy, may be used to form the outer layer 10*ai*.

The driving mechanism 20*i* includes a driving module 22*i* and a first driving rod 24*i*. The first driving rod 24*i* includes a first end 24*ai* and a second end 24*bi* opposite to the first end 24*ai*. The first end 24*ai* is connected to the driving module 22*i*, and the second end 24*bi* is connected to the massage portion 30*i*. Under the action of driving module 22*i*, the massage portion 30*i* rotates along with the second end 24*bi* around the first end 24*ai*, forming an annular trajectory, which can generate a kneading effect on the human body.

In this embodiment, A first vibration component 41*i*, such as a vibration motor, is provided inside the massage portion 30*i*. A second vibrating component 42*i*, such as a vibration motor, is provided inside the massage end 32*i*. A third vibrating component 43*i*, such as another vibration motor, is provided inside the branch 18*i*. The holding end is equipped with buttons 54*i* to control the operation of the driving module 22*i*, the first vibrating component 41*i*, the second vibrating component 42*i*, the third vibrating component 43*i*, and etc. When this sexual stimulation device is in use, the massage portion 30*i*, the massage end 32*i*, and the branch 18*i* may respectively act on three different parts of the human body, for example, the massage end 32*i* may be used to stimulate the vagina, the massage portion 30*i* may be used to stimulate the crus of clitoris, and the branch 18*i* may be used to stimulate the glans of clitoris, further improving the stimulation effect. In an alternatively embodiment, one of the massage portion 30*i*, the massage end 32*i* and the branch 18*i* has a vibrating component disposed therein, or two of the massage portion 30*i*, the massage end 32*i* and the branch 18*i* each has a vibrating component disposed therein.

Finally, it should be noted that: the above merely describes preferred embodiments of the present application without intention to limit the scope of the present application. Although the present application has been described in detail with reference to the foregoing embodiments, for those skilled in the art, the technical solutions described in the foregoing embodiments can still be modified, or some of the technical features can be equally replaced. Any modifications, equivalent replacements, improvements, and etc. made within the spirit and principle of the present application should be within the scope of the present application.

What is claimed is:

1. A massage device for sexual stimulation, comprising:

a shell comprising a first section, a second section, and a third section connected one after another, the second section being connected between the first section and the third section, wherein the shell comprises an outer layer and an inner layer, the inner layer is covered by the outer layer, and the outer layer is a soft layer, a motor actuator disposed in the shell, the motor actuator disposed in the first section, and the motor actuator extending from an interior of the first section towards a side of the second section; wherein the motor actuator comprises a driving motor and a drive shaft, the drive shaft comprises a first shaft body and a second shaft body connected to each other, the driving motor is connected to the first shaft body to drive the drive shaft to rotate around a rotation axis, the rotation axis is at angle with respect to the second shaft body, the first shaft body extends coaxial with the rotation axis, and the first shaft body extends at an angle with respect to the second shaft body; and a branch massage portion connected to the motor actuator, wherein the branch massage portion comprises a massage housing connected to the second shaft body of the drive shaft and a flexible sleeve covering an exterior of the massage housing, the motor actuator is configured to drive the massage housing of the branch massage portion to rotate, the flexible sleeve is a soft layer, the flexible sleeve and the outer layer of the shell are an integral structure; an angle defined by the branch massage portion and the second section is an acute angle; an end of the branch massage portion and an end of the second section are connected to an end of the first section;

wherein the branch massage portion is elongated and extends at least partially along a lateral side of the shell with a gap defined between the branch massage portion and the lateral side of the shell; and the branch massage portion, the second section and the third section are configured to be inserted into a vagina or an anus to massage.

2. The massage device according to claim 1, wherein an end of the first shaft body away from the second shaft body is connected to a motor shaft of the driving motor, at least an end of the second shaft body away from the first shaft body extends into a recess portion extending downward from a sidewall of the shell, and a longitudinal axis of the second shaft body is at an angle with respect to the rotation axis.

3. A massage device for sexual stimulation, comprising:

a shell comprising a first section, a second section, and a third section connected one after another with the second section being connected between the first section and the third section, and the third section being configured as a main massage portion to be inserted into a human body in an insertion direction, the shell defining a recess portion;

a motor actuator disposed in the shell; and a branch massage portion connected to the shell, the branch massage portion being connected to the motor actuator, wherein the motor actuator is configured to drive the branch massage portion to rotate around a rotation axis, and the branch massage portion extends into the recess portion;

wherein the branch massage portion extends in the insertion direction; and the branch massage portion, the second section and the third section are configured to be inserted into a vagina or an anus to massage;

wherein the motor actuator comprises a driving motor and a drive shaft, the drive shaft comprises a first shaft body and a second shaft body connected to each other, wherein an end of the first shaft body away from the second shaft body is connected to a motor shaft of the driving motor, at least an end of the second shaft body away from the first shaft body extends into the recess portion, the second shaft body is connected to the branch massage portion, and the driving motor drives the second shaft body to rotate around the rotation axis, with a longitudinal axis of the second shaft body being at an angle with respect to the rotation axis.

* * * * *